United States Patent
Bagasra

(10) Patent No.: US 9,942,235 B2
(45) Date of Patent: Apr. 10, 2018

(54) NETWORK ACCESS SECURITY FOR INTERNET OF THINGS (IOT) DEVICES

(71) Applicant: Verizon Patent and Licensing Inc., Arlington, VA (US)

(72) Inventor: Abbas Bagasra, Concord, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 71 days.

(21) Appl. No.: 14/970,848

(22) Filed: Dec. 16, 2015

(65) Prior Publication Data

US 2017/0180380 A1    Jun. 22, 2017

(51) Int. Cl.
*H04L 29/06* (2006.01)
*H04L 29/12* (2006.01)
*H04L 29/08* (2006.01)

(52) U.S. Cl.
CPC ........ *H04L 63/101* (2013.01); *H04L 61/1511* (2013.01); *H04L 63/10* (2013.01); *H04L 67/12* (2013.01)

(58) Field of Classification Search
CPC ............................. H04L 61/1511; H04L 63/10
See application file for complete search history.

(56) References Cited

U.S. PATENT DOCUMENTS

| 9,621,355 B1* | 4/2017 | Ochmanski | H04L 9/3247 |
| 2011/0119306 A1* | 5/2011 | Patil | H04L 29/12066 707/783 |
| 2012/0084423 A1* | 4/2012 | McGleenon | H04L 61/1511 709/223 |
| 2013/0085914 A1* | 4/2013 | McPherson | H04L 61/1511 705/34 |
| 2013/0097329 A1* | 4/2013 | Alex | H04L 61/1511 709/228 |
| 2014/0019601 A1* | 1/2014 | Blacka | G06F 17/30887 709/223 |
| 2014/0173111 A1* | 6/2014 | Varner | H04L 63/0281 709/225 |
| 2015/0089061 A1* | 3/2015 | Li | H04L 61/1511 709/226 |
| 2015/0128205 A1* | 5/2015 | Mahaffey | H04L 63/20 726/1 |

(Continued)

OTHER PUBLICATIONS

Keoh, S.L., Kumar, S.S. and Tschofenig, H., 2014. Securing the internet of things: A standardization perspective. IEEE Internet of Things Journal, 1(3), pp. 265-275.*

(Continued)

*Primary Examiner* — James R Turchen

(57) ABSTRACT

A network device receives, from an Internet of Things (IoT) device, a Domain Name System (DNS) query that includes a domain name for resolving a network address associated with a remote server with which the IoT device intends to communicate. The network device retrieves the domain name from the DNS query, determines an identity associated with the IoT device, and determines one or more valid domains associated with the determined IoT device identity. The network device compares the domain name retrieved from the DNS query with the determined one or more valid domains associated with the determined IoT device identity, and allows or denies network access to the IoT device based on the comparison.

20 Claims, 20 Drawing Sheets

(56) References Cited

U.S. PATENT DOCUMENTS

| | | | |
|---|---|---|---|
| 2015/0163289 A1* | 6/2015 | Paul | H04L 67/02 |
| | | | 709/201 |
| 2015/0188949 A1* | 7/2015 | Mahaffey | H04L 63/20 |
| | | | 726/1 |
| 2016/0028749 A1* | 1/2016 | Murynets | H04L 63/1408 |
| | | | 726/22 |
| 2016/0080395 A1* | 3/2016 | Reddy | H04L 63/1425 |
| | | | 726/23 |
| 2016/0100028 A1* | 4/2016 | Erdmann | G08C 17/00 |
| | | | 709/219 |
| 2016/0300049 A1* | 10/2016 | Guedalia | G06F 21/316 |
| 2016/0374043 A1* | 12/2016 | Wetterwald | H04W 4/005 |
| 2017/0019390 A1* | 1/2017 | Gu | H04L 63/08 |
| 2017/0034116 A1* | 2/2017 | Cheng | H04L 67/12 |
| 2017/0093861 A1* | 3/2017 | Kesavan | H04L 63/10 |
| 2017/0155645 A1* | 6/2017 | Wu | H04L 61/1511 |

OTHER PUBLICATIONS

Zhang, Z.K., Cho, M.C.Y., Wang, C.W., Hsu, C.W., Chen, C.K. and Shieh, S., Nov. 2014. IoT security: ongoing challenges and research opportunities. In Service-Oriented Computing and Applications (SOCA), 2014 IEEE 7th International Conference on (pp. 230-234). IEEE.*

Garcia-Morchon, O., Kumar, S., Keoh, S., Hummen, R. and Struik, R., 2013. Security Considerations in the IP-based Internet of Things draft-garciacore-security-06. Internet Engineering Task Force.*

* cited by examiner

NETWORK ACCESS SECURITY FOR INTERNET OF THINGS (IOT) DEVICES

BACKGROUND

The "Internet of Things" (IoT) is a network of physical objects or devices (i.e., "things") where the objects or devices are specially designed for a specific function, unlike general computing devices like a desktop or laptop computer. IoT objects or devices are embedded with electronics and network connectivity that enables these objects or devices to collect, store and exchange data. The network connectivity may include, for example, Bluetooth™ connectivity, Wi-Fi connectivity, and/or cellular network connectivity. An IoT object or device may additionally have computational capability, with various installed software (e.g., apps), and may also include one or more of various types of sensors. An IoT object or device may be, via the network connectivity, controlled remotely across existing network infrastructure. An IoT object or device may use the network connectivity to communicate with other IoT devices, or with certain nodes (e.g., a particular server or computer) across the Internet.

DETAILED DESCRIPTION OF THE PREFERRED EMBODIMENTS

Figure 1:
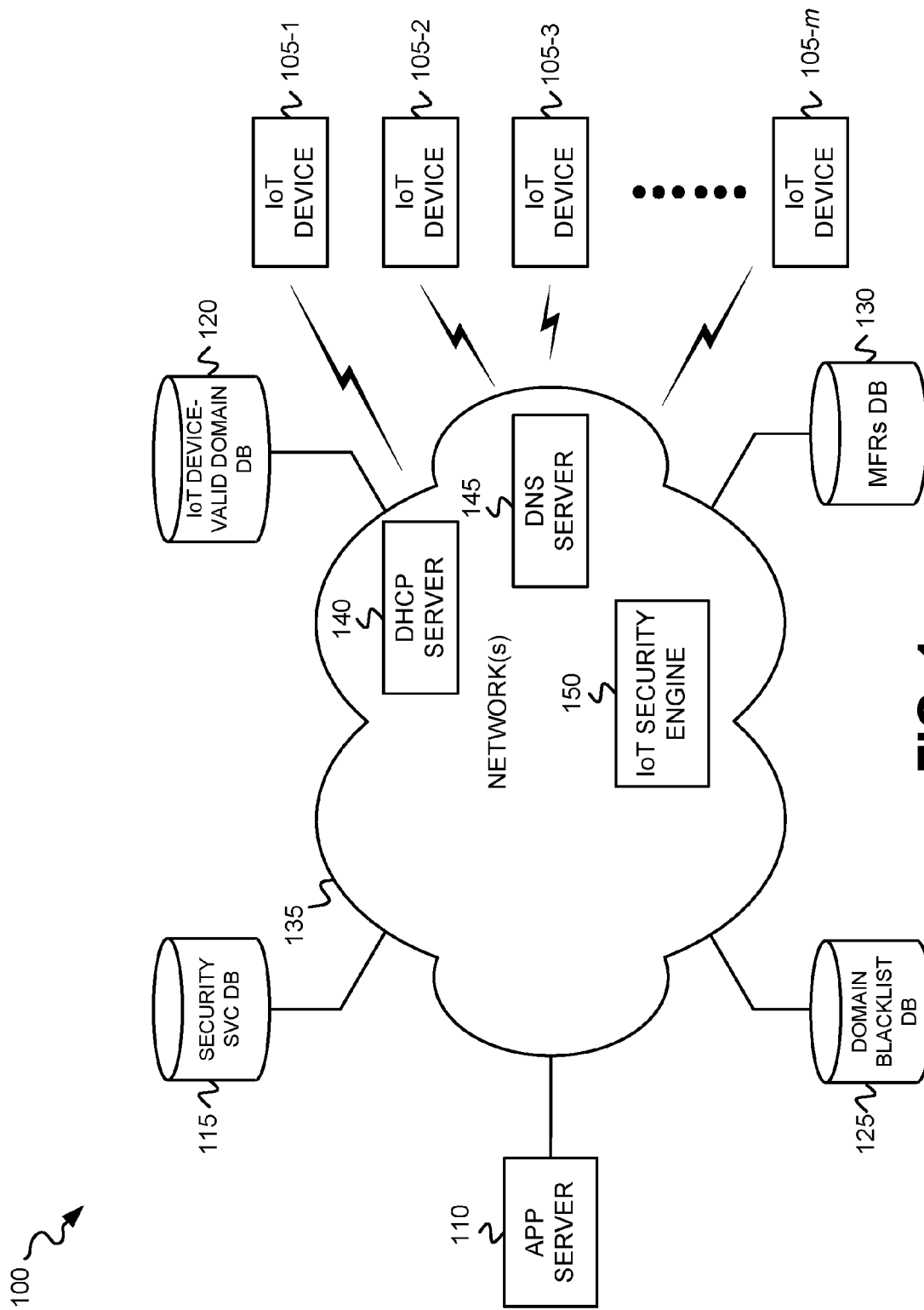
FIG. 1 illustrates an exemplary network environment in which security is provided for controlling network access by IoT devices.

The following detailed description refers to the accompanying drawings. The same reference numbers in different drawings may identify the same or similar elements. The following detailed description does not limit the invention.

Most IoT, or "machine-to-machine" (M2M), objects or devices are connected to, and managed by, intelligent application servers in the "cloud." IoT objects or devices are vulnerable to hacking and malware, with infected IoT objects or devices possibly collecting data and sending the data to rogue servers to enable the stealing of information. IoT objects or devices infected with malware can launch denial of service attacks by disrupting service and/or launching attacks on other devices.

Since many IoT devices are battery operated, and have limited memory and/or processing power, installing client security software on IoT devices is not practical. Any technique for providing security against infected IoT devices should also support the two dominant architectures for how IoT devices connect to application servers via the "cloud." In the first type of architecture, the IoT device has a built-in modem and can directly connect to a mobile network. In the second type of architecture, the IoT device indirectly connects to a fixed network via a gateway that aggregates many IoT devices. In this second type of architecture, a security server may not be able to identify the IoT device behind the gateway due to the use of a private Internet Protocol (IP) address and Network Address Translation (NAT).

A same IoT device may connect to different servers at different times for a same application. Additionally, a given server may host different applications servicing different IoT devices. IoT devices may use a Content Delivery Network(s) (CDN(s)) for load distribution and scale. Therefore, any technique for providing security for IoT access to a network should be able to distinguish a given IoT's access to a valid CDN server, as opposed to access to a rogue server. Command and control signals from remote servers may signal malware at a given IoT device to launch a DOS attack, so any technique for providing security for IoT devices should also prevent denial of service (DDOS) attacks initiated from the IoT devices.

Exemplary embodiments described herein provide security for IoT device access to a network by performing a security check in the network at each IoT device's point of network attachment. The network security for IoT devices, described herein, is network agnostic in that it protects the network from devices in both a fixed and mobile network context. The network security for IoT devices, described herein, additionally provides network security for both directly and indirectly connected IoT devices.

Malware is most commonly installed on an IoT device via online phishing or similar techniques. Once the malware is installed on the IoT device, the malware sends a Domain Name System (DNS) query to perform a domain name DNS lookup that resolves the IP address of the malware command and control server. The malware uses a DNS lookup, instead of the full static IP address of the command and control server, to mask ownership. Use of a static IP address associated with the malware command and control server, by the malware, would lead to easy identification and blocking of the static IP address. The hostname associated with the malware enables the use of Network Address Translation (NAT) for mapping a Public IP address to a private IP address. The malware's command and control server can be masked by hopping across different Internet Service Providers (ISPs) and/or by hiding behind other networks. For these reasons, almost all malware uses a hostname DNS lookup to resolve the malware command and control server IP address.

FIG. 1 illustrates an exemplary network environment 100 in which security is provided for controlling network access by IoT devices. Network environment 100 may include IoT devices 105-1 through 105-m, an app server 110, a security service (svc) database (DB) 115, an IoT device-valid domain DB 120, a domain blacklist DB 125, a manufacturers (MFRs) DB 130, and a network 135. As shown, network 135 includes, in addition to other network components not shown, a Dynamic Host Configuration Protocol (DHCP) server 140, a Domain Name System (DNS) server 145, and an IoT security engine 150.

IoT devices 105-1 through 105-m (generically referred to herein as "IoT device 105" or "IoT devices 105") each include a physical object or device (i.e., a "thing") that may be designed for a specific function and which may be embedded with electronics, memory storage, and network connectivity that enables these objects or devices to collect, store and exchange data with other IoT devices or with certain network nodes. Each device 105's network connectivity may include, for example, Bluetooth™ connectivity, Wi-Fi connectivity, and/or cellular network connectivity.

App server 110 includes one or more network devices with which IoT devices 105 may communicate to exchange data and/or to receive commands. IoT devices 105 may communicate with app server 110 only after IoT security engine 150 permits access to network 135 using a network access security service implemented by various processes described herein.

Security service (SVC) DB 115 includes one or more network devices that store a data structure(s) that permits a lookup to determine whether each of IoT devices 105 has "opted in" for the network access security service described herein, where an IoT device 105 that has "opted in" includes a device whose owner, administrator and/or operator has subscribed to a network access security service. A lookup may be performed in security SVC DB 115 using an IP address or other types of device identifiers associated with the IoT device 105, and if the IP address or other type of device identifier is found during the lookup, the IoT device 105 is considered to have "opted in," and the network access security service described herein is applied to communications from IoT device 105.

IoT device-valid domain DB 120 includes one or more network devices that store a data structure(s) that permits a lookup to determine any valid domains that are associated with a particular IoT device 105. A "valid domain," as referred to herein includes a domain name(s) associated with Internet resources (e.g., computers, servers, etc.) to whom it is considered appropriate, and not a security risk, for a particular IoT device 105 to communicate. DB 120 may be indexed with an identifier of the IoT device 105, or with an IP address assigned to the IoT device 105, to retrieve one or more valid domains stored in DB 120. For example, if an IoT device 105 having a particular IP address sends a DNS query that includes a particular domain name, IoT security engine 150 retrieves the domain name from the DNS query, and then performs a lookup in DB 120 using a device ID of IoT device 105. The lookup retrieves a list of valid domain names, and the retrieved domain name is compared with each of the valid domain names, with a match indicating that it is not a security risk for IoT device 105 to communicate with the network device associated with the resolved domain name.

Domain blacklist DB 125 includes one or more network devices that store a data structure(s) that further stores a list of blacklisted domain names. IoT security engine 150 may deny network access to any IoT device 105 that sends a DNS query for attempting to communicate with any of the domain names contained in domain blacklist DB 125.

Mfrs DB 130 includes one or more network devices that store data structures that further store manufacturer's data in association with an organizationally unique identifier (OUI). Each OUI includes a unique identifier assigned to the IoT device 105 by a manufacturer (or owner, operator or administrator) of the device. The manufacturer's data stored in association with the OUI includes various data regarding the organization that manufactured device 105, or which owns, operates and/or administers IoT device 105. The manufacturer's data may include valid domain names with which device 105 may legitimately communicate for exchanging data, or for receiving commands from a network device (e.g., server) associated with a particular valid domain name.

DHCP server 140 includes one or more network devices that implement the DHCP protocol for assigning an IP address to a requesting IoT device 105, and for providing an IP address for the DNS server 145 to which the requesting IoT device 105 can send DNS queries.

DNS server 145 includes one or more network devices that receive domain names in DNS queries, and resolves (i.e., translates) those domain names into corresponding IP addresses. DNS server 145 may return the resolved IP address to the network device that originated the DNS query. In one implementation, DNS server 145 may additionally implement IoT security engine 150, described below.

IoT security engine 150 includes functionality implemented in a stand-alone network device, or implemented in an existing network device. In one implementation, IoT security engine 150 may include software functionality installed in DNS server 145. IoT security engine 150 executes processes described herein for implementing a network access security service that permits or denies access to network 135, by IoT devices 105-1 through 105-m.

Network 135 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network). In one implementation, network(s) 135 may include a PLMN or satellite mobile network connected to the Internet. In another implementation, network(s) 135 may include a fixed network (e.g., an optical cable network) connected to the Internet.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though a single app server 110 is depicted in FIG. 1, multiple different app servers 110 may connect to network(s) 135 for communication with one or more of IoT devices 105.

Figure 2A:
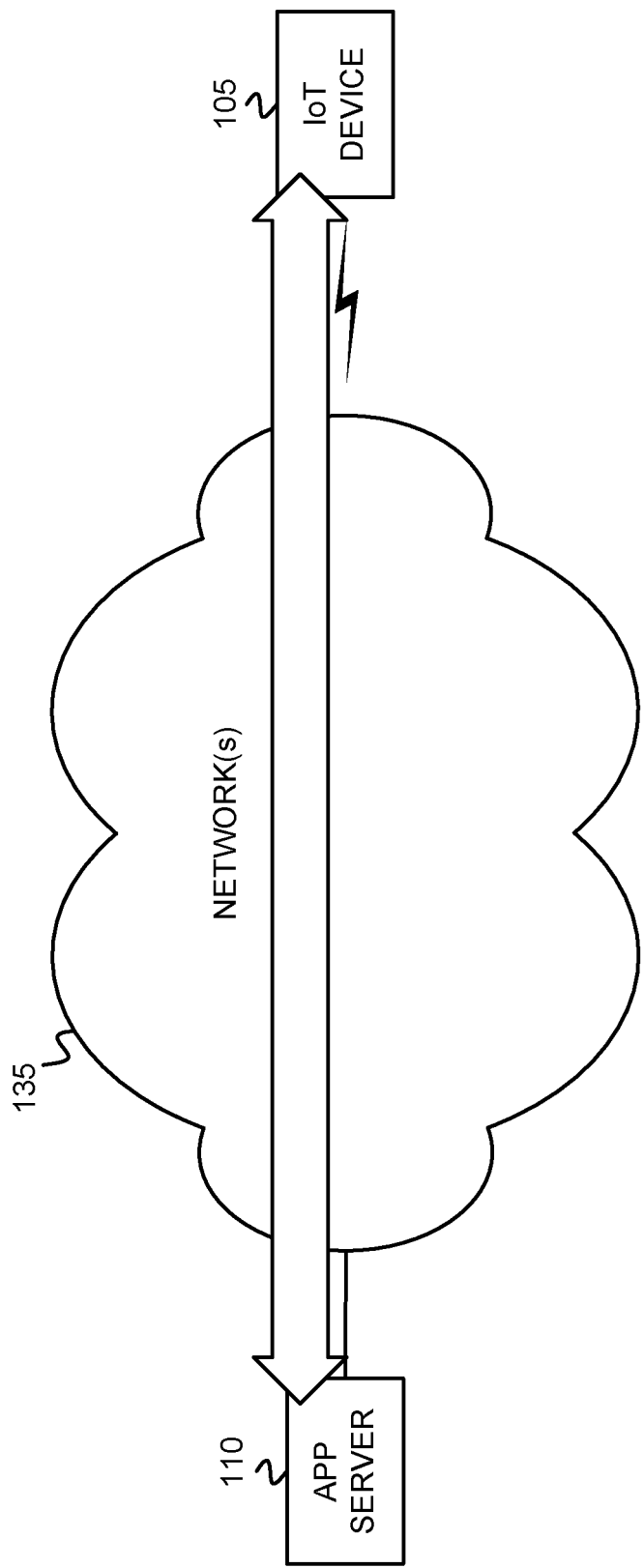
FIGS. 2A and 2B illustrate two different common network architectures in which IoT devices 105 of FIG. 1 attempt to access a network for communicating with an app server.
Figure 2B:
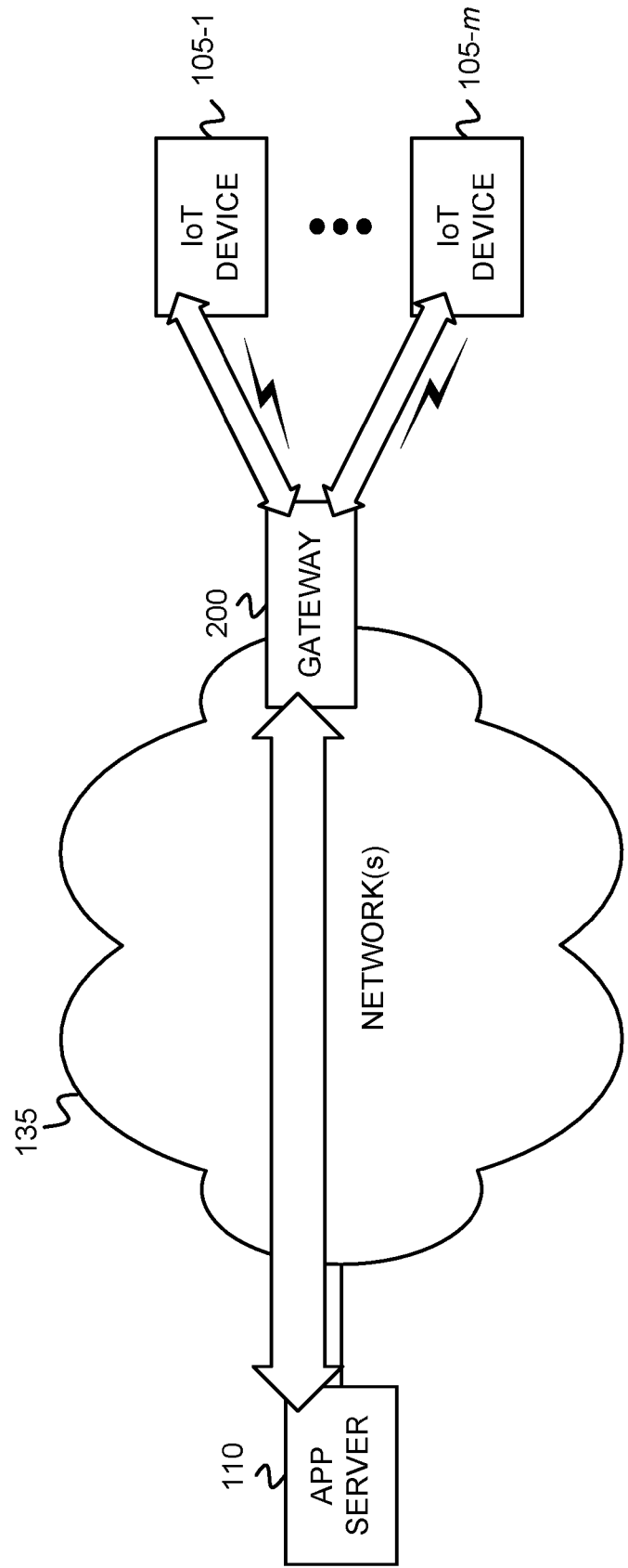

FIGS. 2A and 2B illustrate two different common network architectures in which IoT devices 105 attempt to access a network for communicating with an app server 110. FIG. 2A depicts a network architecture in which IoT device 105 directly connects with network(s) 135, without any intervening gateway. In the network architecture shown in FIG. 2A, IoT device 105 typically has a built-in modem and may communicate with app server 110 directly via network(s) 135. FIG. 2B depicts a network architecture in which a gateway 200 aggregates IoT devices 105-1 through 105-m, and gateway 200 may use NAT for forwarding data units to/from IoT devices 105-1 through 105-m. In the network architecture shown in FIG. 2B, gateway 200 may use fixed broadband for interconnecting with network(s) 135, and may forward data to/from IoT devices 105-1 through 105-m based on the use of private IP addresses and NAT.

Figure 3:
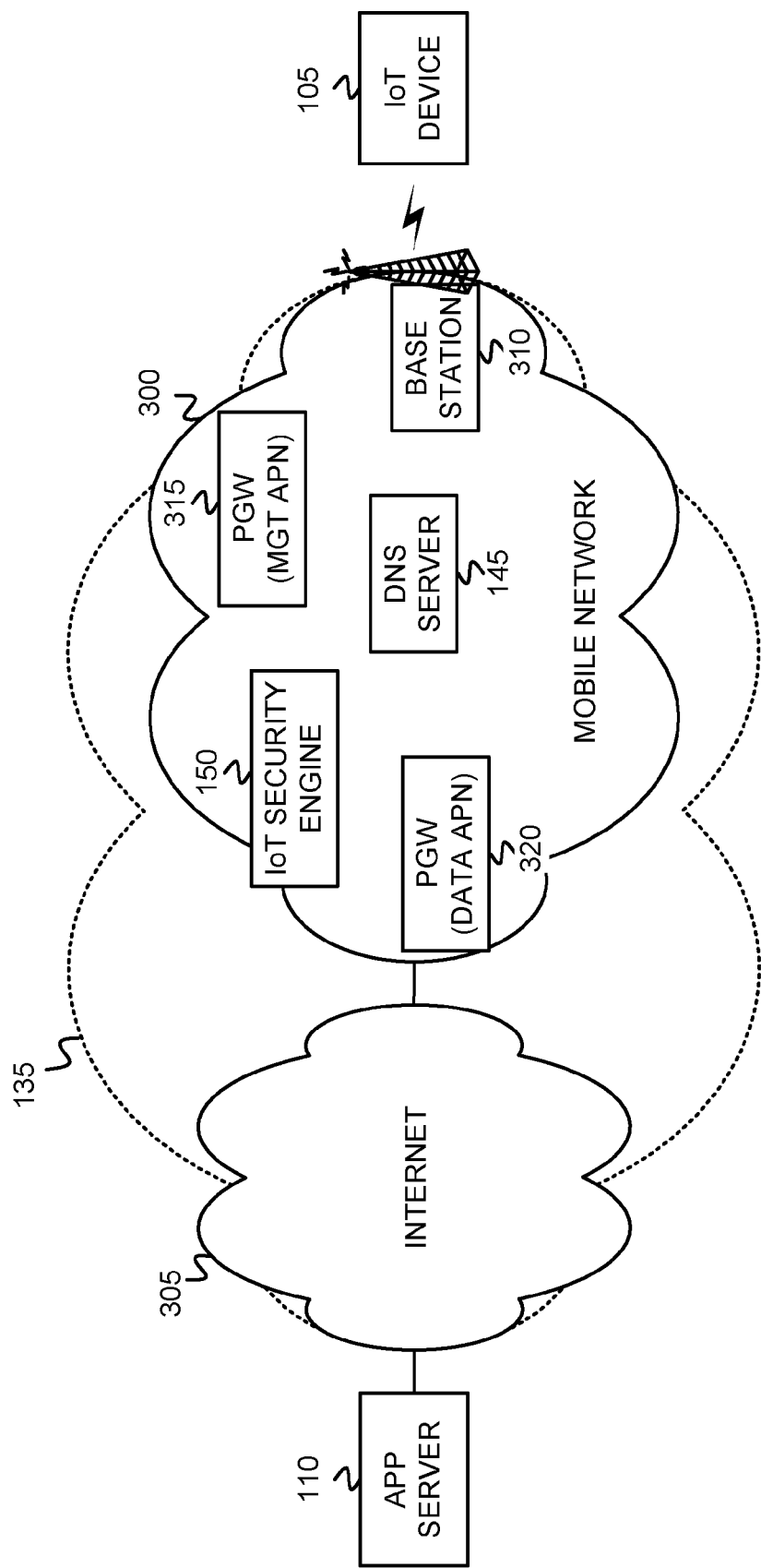
FIG. 3 depicts details of an example of the directly connected network architecture of FIG. 2A where the network includes a mobile Public Land Mobile Network interconnected with the Internet.

FIG. 3 depicts details of an example of the directly connected network architecture of FIG. 2A where network(s) 135 includes a mobile PLMN network 300 interconnected with the Internet 305. As shown, mobile network 300 includes a base station 310, a packet data network gateway (PGW)-management (MGT) access point name (APN) 315, a PGW-data APN 320, DNS server 145, and IoT security engine 150. Base station 310 acts as a wireless access point for an IoT device 105 such that IoT device 105 may communicate wirelessly with base station 310 which, in turn, may forward those communications via wired or wireless links to other nodes in PLMN network 300. The International Mobile Station Equipment Identity (IMEI) of the IoT device 105 becomes available when the IoT device 105 attaches to PGW-MGT APN 315. PGW-MGT APN 315 may act as a DHCP server (e.g., as DHCP server 140 of FIG. 1) within PLMN network 300 to IoT devices 105 attempting to connect to PLMN network 300. PGW-data APN 320 may act as a gateway between IoT device 105 and an externally connected packet data network, such as, the Internet 305 shown in FIG. 3. PGW-data APN 320 directs packet data units sent from IoT device 105 to a node in the Internet 305, and directs packets, received from a node in the Internet 305, towards destination IoT device 105.

Figure 4:
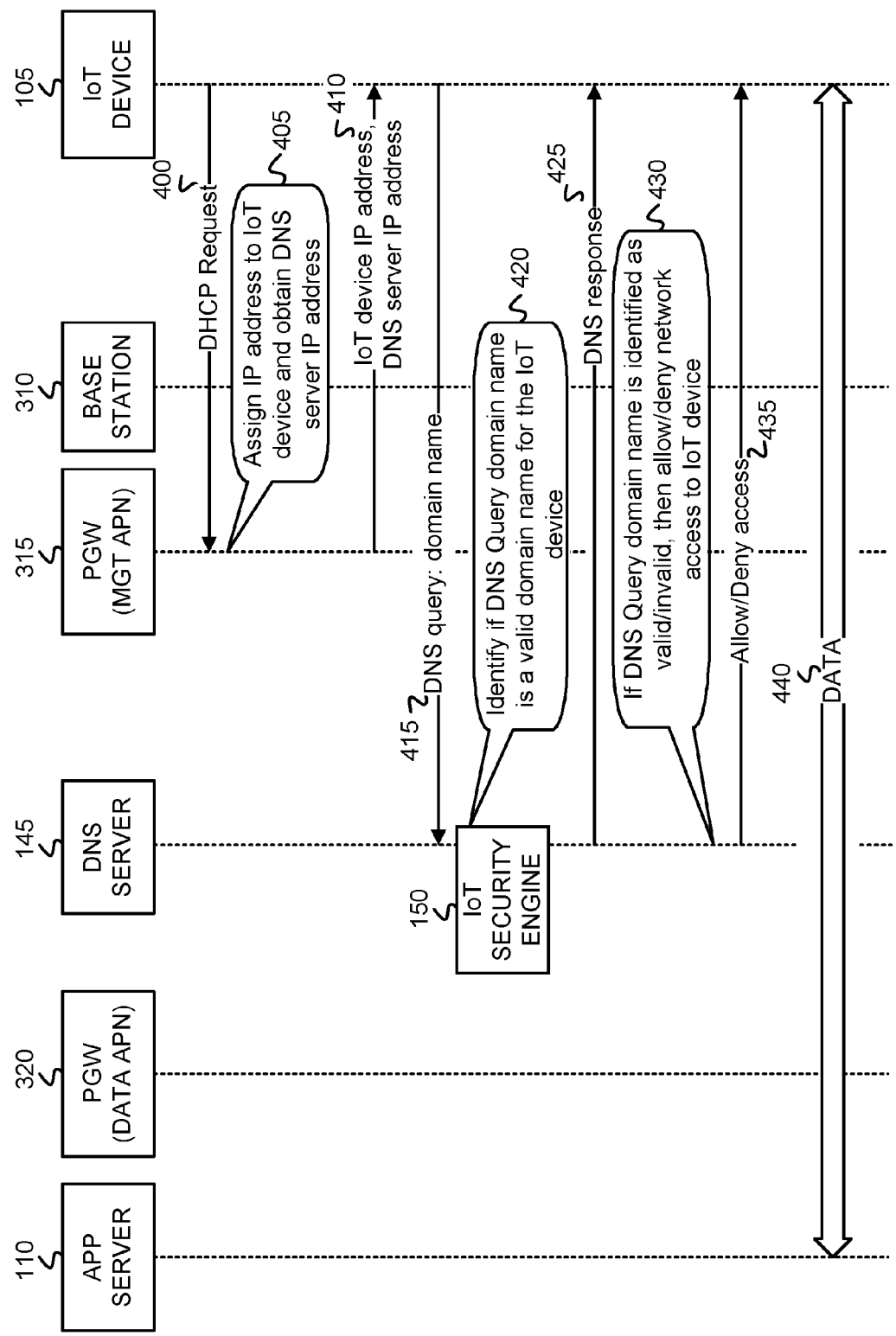
FIG. 4 depicts exemplary messaging and operations associated with providing network access security for IoT devices within the context of the network architecture of FIG. 3.

FIG. 4 depicts exemplary messaging and operations associated with providing network access security for IoT devices 105 within the context of the network architecture of FIG. 3 where IoT devices 105 attempt to communicate with nodes in the Internet 305 via a mobile PLMN network 300 interconnected with the Internet 305. As shown in FIG. 4, upon IoT device 105 connecting to base station 310, IoT device 105 sends a DHCP request message 400 to PGW-MGT APN 315 via base station 310. Upon receipt of message 400, PGW 315, using the DHCP protocol, assigns 405 an IP address to IoT device 105, and obtains the IP address of the DNS server 145 to which IoT device 105 should send DNS queries. PGW 315 sends a message 410 that includes the IP address assigned to IoT device 105, and the DNS server's IP address.

Upon receipt of message 410, IoT 105 sends a DNS query message 415, which includes a domain name, and which requests an IP address associated with the domain name. When DNS server 145 receives message 415, DNS server 145 retrieves the domain name from message 415 and, in one implementation, forwards the domain name to IoT security engine 150. In an implementation in which IoT security engine 150 is implemented by DNS server 145, IoT security engine 150 directly obtains the domain name from message 415. Once the domain name is obtained by IoT security engine 150, IoT security engine 150 identifies 420 if the DNS query domain name is a valid domain name for the particular IoT device 105 using processes described herein. If the DNS query domain name is a valid domain name for IoT device 105, then DNS server 145 may obtain the IP address associated with the domain name (i.e., the domain name of app server 110), and return a DNS response message 425, via base station 310, to IoT device that includes the obtained IP address. If the DNS query domain name is not a valid domain name for IoT device 105, then DNS server 145 may return an error message (not shown) to IoT device 105, may simply not return a DNS response, or may return a DNS response that does not include any IP address associated with the DNS query domain name.

If the DNS query domain name is identified as valid, then IoT security engine 150 may allow 430 network access to IoT device 105 by sending a network access message 435 that notifies IoT device 105 of its permission to access the network. IoT device 105 and app server 110 may then communicate and exchange data 440 with one another. If the DNS query domain name is not identified as a valid domain name, then IoT security engine 150 may deny 435 network access to IoT device 105 by sending a network denial message 435 that notifies IoT device 105 that its access to the network is denied and blocked.

Figure 5:
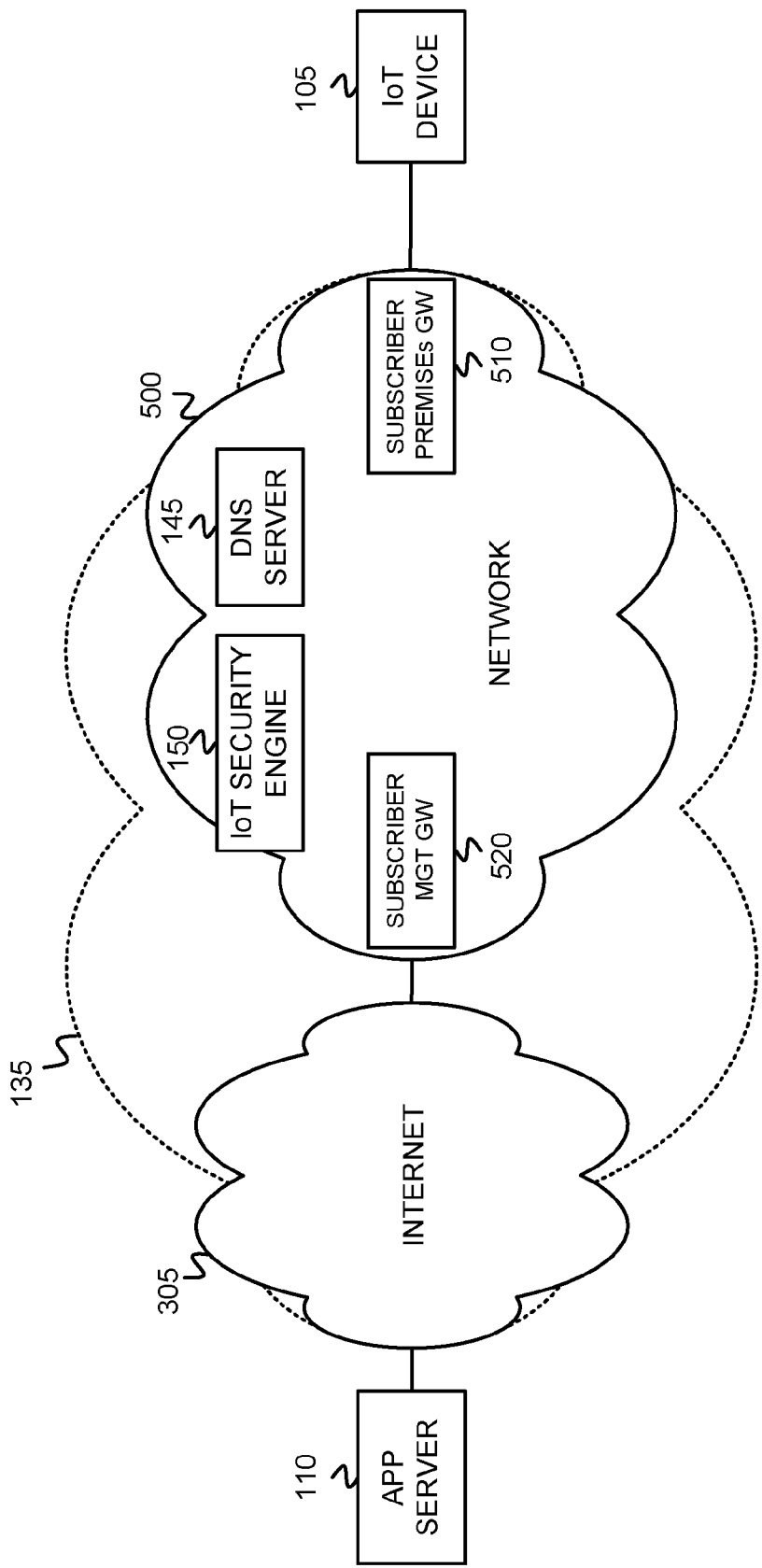
FIG. 5 depicts details of an example of the indirectly connected network architecture of FIG. 2B where the network includes a fixed network interconnected with the Internet.

FIG. 5 depicts details of an example of the indirectly connected network architecture of FIG. 2B where network(s) 135 includes a fixed network (e.g., an optical fiber cable network) 500 interconnected with the Internet 305. As shown, fixed network 500 includes a subscriber premise gateway (GW) 510, a subscriber MGT GW 520, DNS server 145, and IoT security engine 150.

Subscriber premise GW 510 acts as a network access point for an IoT device 105 such that subscriber premise GW 510 forwards communications from IoT device 105 to other nodes in network 500, and subscriber premise GW 510 receives communications from other nodes in network 500 or the Internet 305 and forwards the communications on to IoT device 105.

Subscriber MGT GW 520 may act as a DHCP server (e.g., as DHCP server 140 of FIG. 1) within network 500 to IoT devices 105 attempting to connect to network 500, and may also act as a gateway between IoT device 105 and an externally connected packet data network, such as the Internet 305 shown in FIG. 5. Subscriber MGT GW 520 directs packet data units sent from IoT device 105 to a node in the Internet 305, and directs packets, received from a node in the Internet 305, towards destination IoT device 105.

Figure 6:
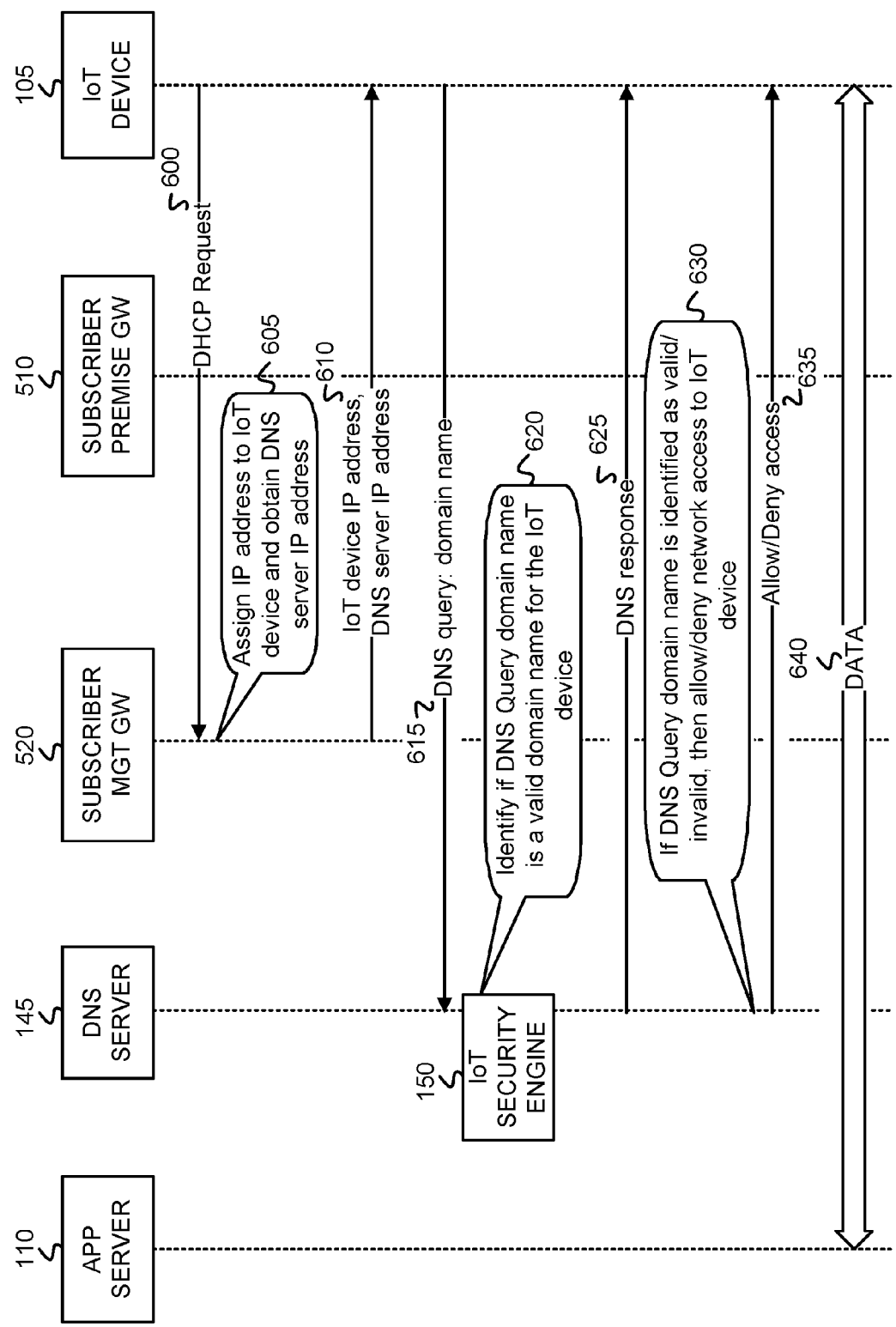
FIG. 6 depicts exemplary messaging and operations associated with providing network access security for IoT devices within the context of the network architecture of FIG. 5.

FIG. 6 depicts exemplary messaging and operations associated with providing network access security for IoT devices 105 within the context of the network architecture of FIG. 5 where IoT devices 105 attempt to communicate with nodes in the Internet 305 via fixed network 500 interconnected with the Internet 305. As shown in FIG. 6, upon IoT device 105 connecting to network 500, IoT device 105 sends a DHCP request message 600 to subscriber MGT GW 520 via subscriber premise GW 510. Upon receipt of message 600, subscriber MGT GW 520, using the DHCP protocol, assigns 605 an IP address to IoT device 105, and obtains the IP address of the DNS server 145 to which IoT device 105 should send DNS queries. Subscriber MGT GW 520 sends a message 610 that includes the IP address assigned to IoT device 105, and the DNS server 145's IP address.

Upon receipt of message 610, IoT 105 sends a DNS query message 615, which includes a domain name, and which requests an IP address associated with the domain name. When DNS server 145 receives message 615, DNS server 145 retrieves the domain name from message 615 and, in one implementation, forwards the domain name to IoT security engine 150. In an implementation in which IoT security engine 150 is implemented by DNS server 145, IoT security engine 150 obtains the domain name from message 615. Once the domain name is obtained by IoT security engine 150, IoT security engine 150 identifies 620 if the DNS query domain name is a valid domain name for the particular IoT device 105 using processes described herein. If the DNS query domain name is a valid domain name for IoT device 105, then DNS server 145 may obtain the IP address associated with the domain name (i.e., the domain name of app server 110), and return a DNS response message 625, via subscriber premise GW 510, to IoT device 105 that includes the obtained IP address. If the DNS query domain name is not a valid domain name for IoT device 105, then DNS server 145 may return an error message (not shown) to IoT device 105, may just not return a DNS response, or may return a DNS response that does not include any IP address associated with the DNS query domain name.

If the DNS query domain name is identified as valid, then IoT security engine 150 may allow 630 network access to IoT device 105 by sending a network access message 635 that notifies IoT device 105 of its permission to access the network. IoT device 105 and app server 110 may then communicate and exchange data 640 with one another. If the DNS query domain name is not identified as a valid domain name, then IoT security engine 150 may deny 635 network access to IoT device 105 by sending a network denial message 635 that notifies IoT device 105 that its access to the network is denied and blocked.

Figure 7:
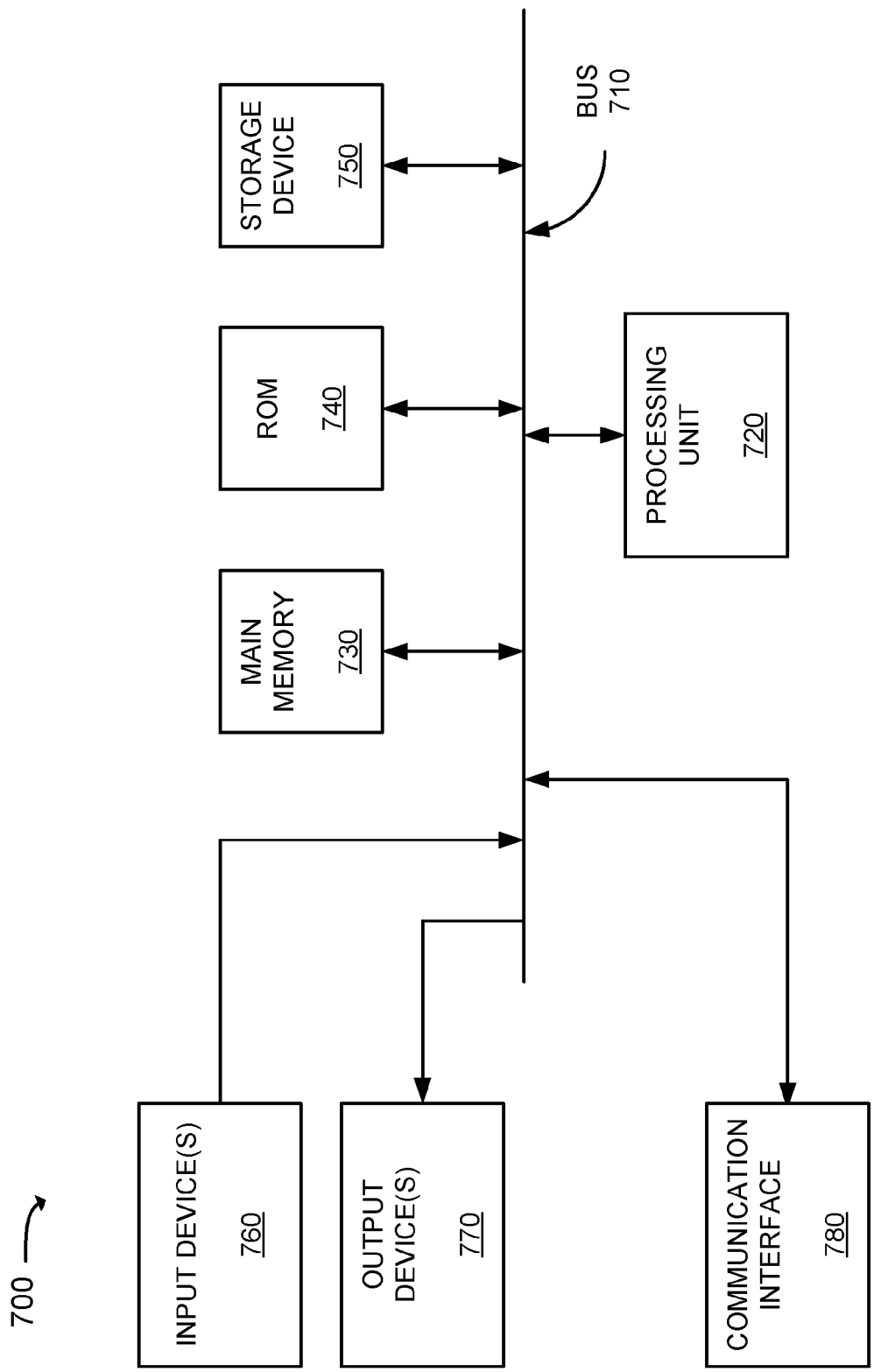
FIG. 7 is a diagram that depicts exemplary components of a computational device that may correspond to the IoT devices, app server, databases, Dynamic Host Configuration Protocol server, and Domain Name Server of FIG. 1.

FIG. 7 is a diagram that depicts exemplary components of a computational device 700 (referred to herein as "device 700"). IoT devices 105, app server 110, DBs 115, 120, 125 and 130, DHCP server 140, and DNS server 145 may each be configured similarly to device 700, possibly with some variations in components and/or configuration. Device 700 may include a bus 710, a processing unit 720, a main memory 730, a read only memory (ROM) 740, a storage device 750, an input device(s) 760, an output device(s) 770, and a communication interface(s) 780.

Bus 710 may include a path that permits communication among the components of device 700. Processing unit 720 may include one or more processors or microprocessors, or processing logic, which may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium. Main memory 730, ROM 740 and storage device 750 may each be referred to herein as a "tangible non-transitory computer-readable medium."

Input device 760 may include one or more mechanisms that permit an operator to input information to device 700, such as, for example, a keypad or a keyboard, a display with a touch sensitive panel, voice recognition and/or biometric mechanisms, etc. Output device 770 may include one or more mechanisms that output information to the operator or user, including a display, a speaker, etc. Input device 760 and output device 770 may, in some implementations, be implemented as a graphical user interface (GUI) that displays GUI information and which receives user input via the GUI. Communication interface(s) 780 may include a transceiver that enables device 700 to communicate with other devices and/or systems. For example, communication interface(s) 780 may include wired and/or wireless transceivers for communicating via network(s) 135.

The configuration of components of device 700 shown in FIG. 7 is for illustrative purposes. Other configurations may be implemented. Therefore, device 700 may include additional, fewer and/or different components, arranged in a different configuration, than depicted in FIG. 7. For example, an IoT device 105 may include similar components to those shown in FIG. 7, but may omit input device(s) 760, output device(s) 770, and storage device 750.

Figure 8:
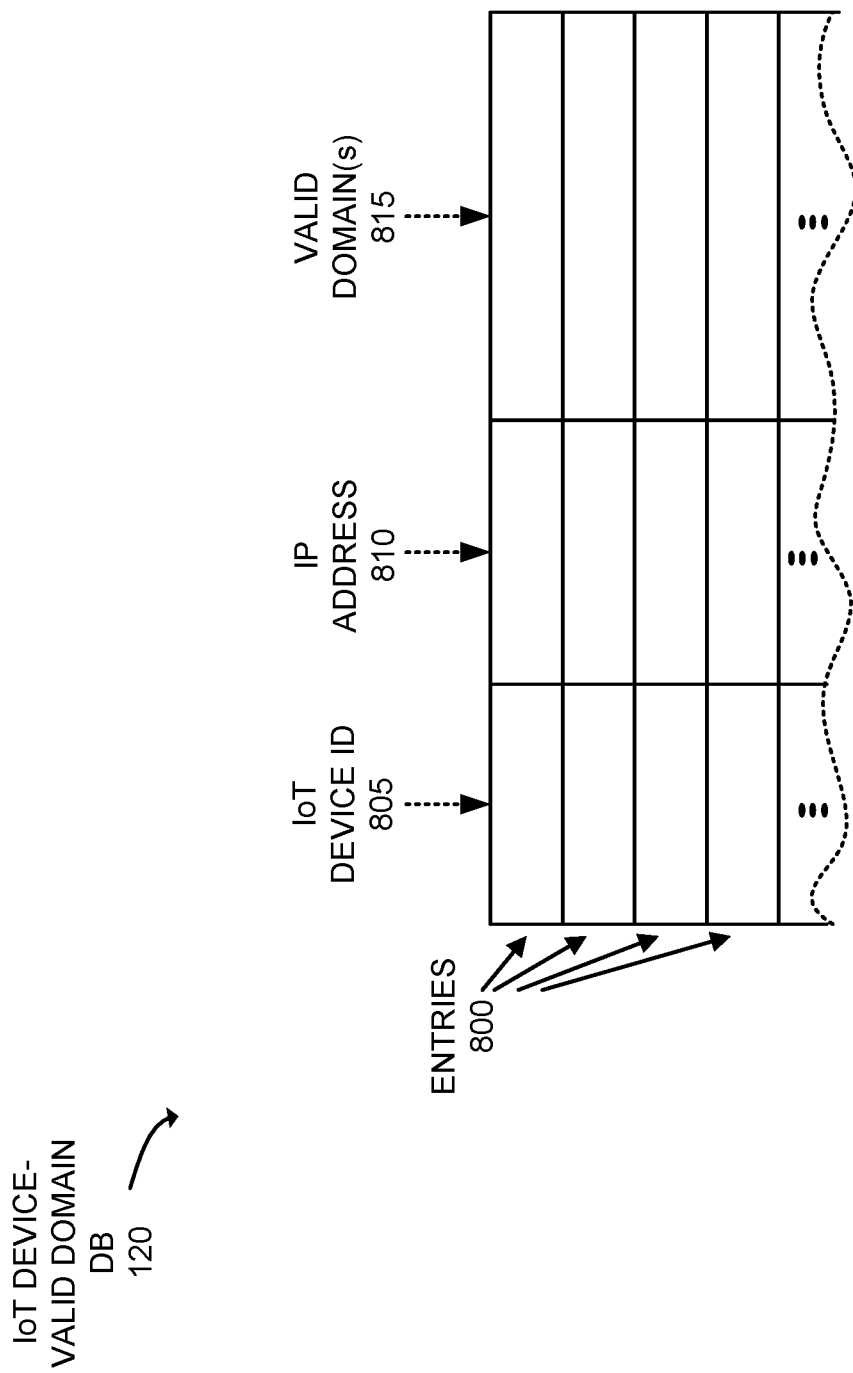
FIGS. 8-11 are diagrams that depict exemplary implementations of data structures stored in the several databases of FIG. 1.

FIG. 8 is a diagram that depicts an exemplary implementation of a data structure stored in IoT device-valid domain DB 120. As shown, the data structure of DB 120 may include multiple entries 800, with each entry 800 including an IoT device identifier (ID) field 805, an IP address field 810, and a valid domain(s) field 815. Each entry 800 may be indexed with, for example, a particular IoT device ID to locate an entry 800 having a matching IoT device ID value stored in IoT device ID field 805. When such an entry 800 is located, data may be stored in one or more of fields 810 and/or 815 of the entry 800, or data may be retrieved from one or more of fields 810 and/or 815 of the entry 800. Other fields of an entry 800, instead of IoT device ID field 805 may be used for indexing DB 120, including, for example, IP address field 810.

IoT device ID field 805 may store any type of globally unique identifier assigned to, or associated with, a particular IoT device 105. In one embodiment, the globally unique identifier may include a Media Access Control (MAC) address, where the MAC address further includes an organizationally unique identifier (OUI) combined with a serial number of the IoT device 105. IP address field 810 may store an IP address assigned to the IoT device 105 identified in field 805 of a same entry 800. For example, the IP address may be assigned to the IoT device 105, using the DHCP protocol, by DHCP server 140.

Valid domain(s) field 815 stores one or more domain names that have been, using the exemplary processes described below, associated with a particular IoT device 105 identified in field 805 of an entry 800, where those associated domain names have been identified as being legitimate and valid domain names with which the particular IoT device 105 may communicate (e.g., a list of domains that the IoT device 105 may "visit"). Therefore, as described in further detail herein, attempts by the IoT device 105 to communicate with domain names stored in field 815 may result in the granting of network access by IoT security engine 150, whereas attempts by the IoT device 105 to communicate with domain names not contained in field 815 may result in the denial of network access to the IoT device 105 by IoT security engine 150.

Figure 9:
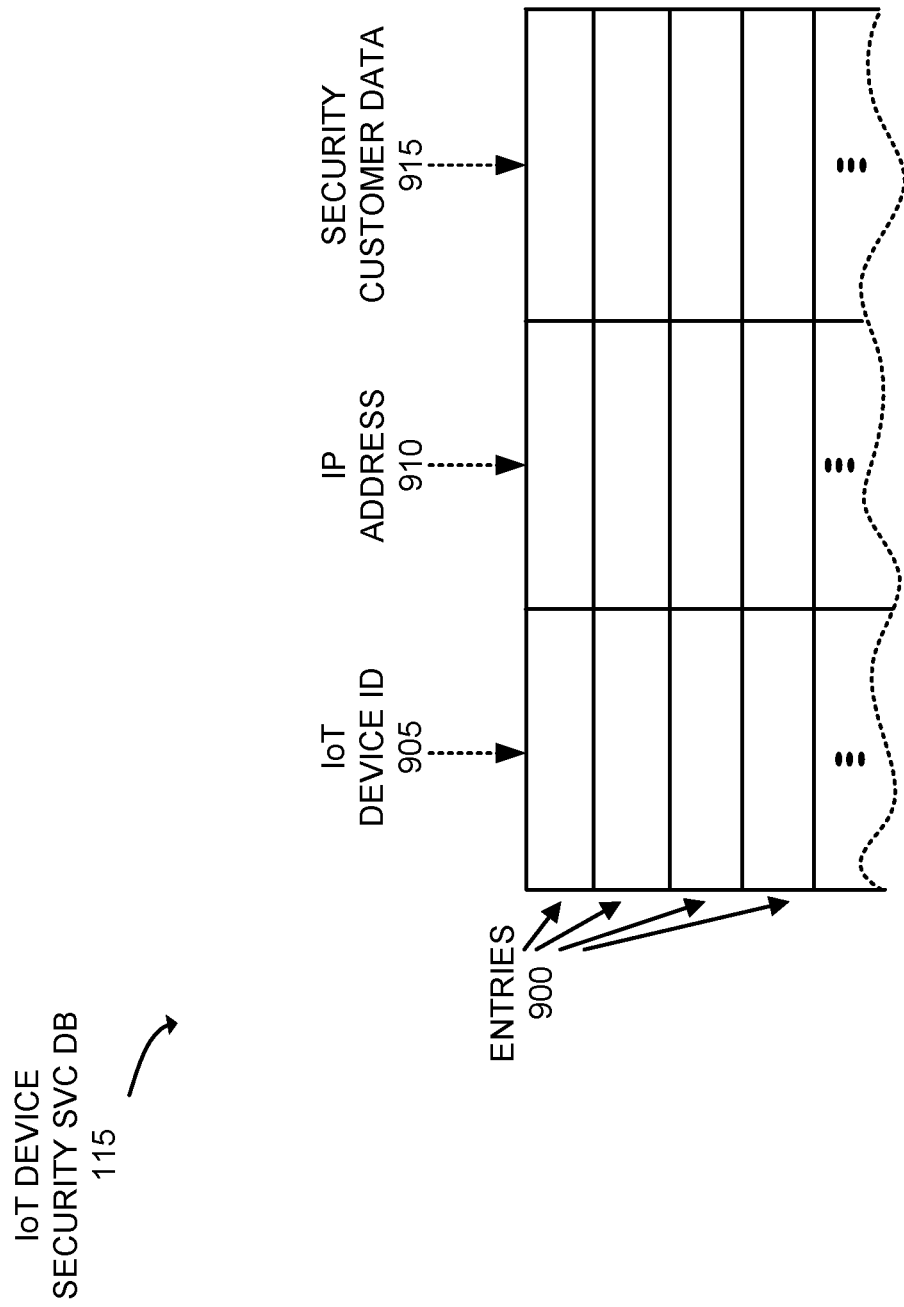

FIG. 9 is a diagram that depicts an exemplary implementation of a data structure stored in IoT device security SVC DB 115. As shown, the data structure of DB 115 may include multiple entries 900, with each entry 900 including an IoT device identifier (ID) field 905, an IP address field 910, and a security customer data field 915. Each entry 900 may be indexed with, for example, a particular IoT device ID to locate an entry 900 having a matching IoT device ID value stored in IoT device ID field 905. When such an entry 900 is located, data may be stored in one or more of fields 910 and/or 915 of the entry 900, or data may be retrieved from one or more of fields 910 and/or 915 of the entry 900. Other fields of an entry 900, instead of IoT device ID field 905 may be used for indexing DB 115, including, for example, IP address field 910.

IoT device ID field 905 may store any type of globally unique identifier assigned to, or associated with, a particular IoT device 105. In one embodiment, the globally unique identifier may include a MAC address, where the MAC address further includes a OUI combined with a serial number of the IoT device 105. The globally unique ID stored in field 905 for a particular IoT device 105 may be a same globally unique ID stored in field 805 of DB 120 for that same IoT device 105.

IP address field 910 may store an IP address assigned to the IoT device 105 identified in field 905 of a same entry 900. For example, the IP address may be assigned to the IoT device 105, using the DHCP protocol, by DHCP server 140. The IP address stored in field 910 for a particular IoT device 105 may be a same IP address stored in field 805 of DB 120 for that same IoT device 105.

Security customer data field 915 stores data associated with a customer of a security service subscribed to by that customer, where the customer is an owner, operator, and/or administrator of the IoT device 105 identified in field 905 of a same entry 900. In one embodiment, field 915 may store an indication that the IoT device 105 identified in field 905 of entry 900 is "opted in" to the network access security service described herein. Field 915 may additionally store information associated with the customer including, for example, a name, contact information (e.g., email address, telephone number), payment information, postal address information, etc.

Figure 10:
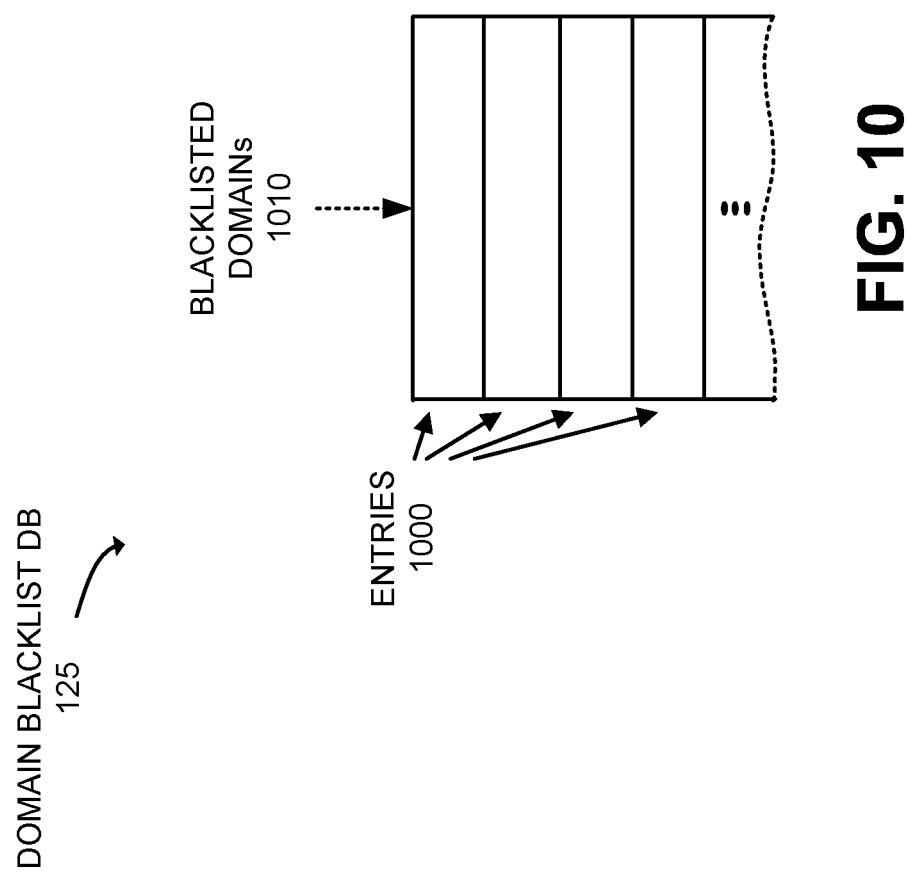

FIG. 10 is a diagram that depicts an exemplary implementation of a data structure stored in domain blacklist DB 125. As shown, the data structure of DB 125 may include multiple entries 1000 that make up a list. Each entry 1000 of the list may include a blacklisted domain field 1010 that stores data indicating a particular domain name that is blacklisted (i.e., identified as an invalid domain name with which an IoT device 105 may not communicate). In the event that a domain name, contained in domain blacklist DB 125, is contained in a DNS query from an IoT device 105, IoT security engine 150 may deny network access to that particular IoT device 105 as attempting to communicate with an invalid domain.

Figure 11:
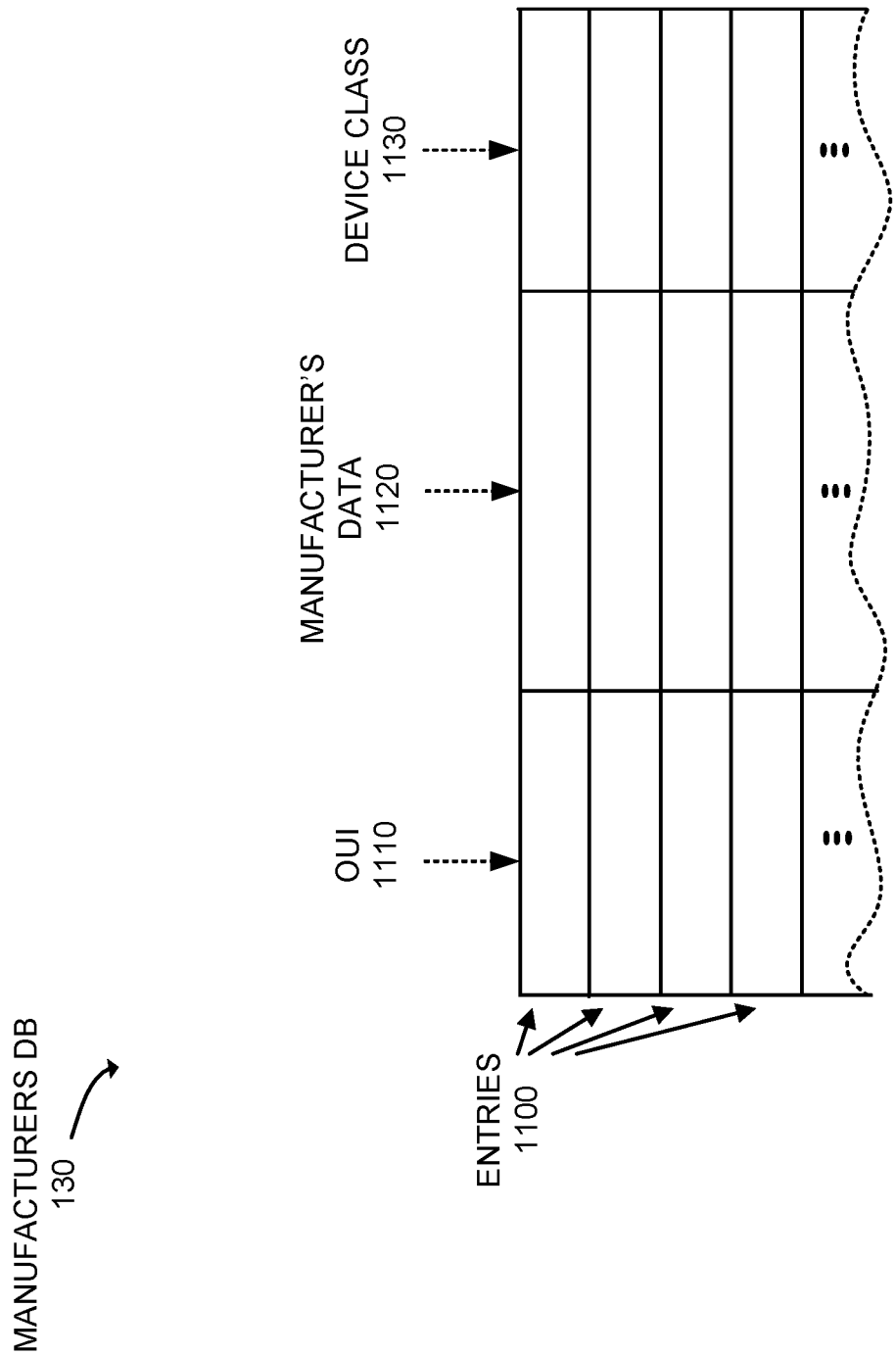

FIG. 11 is a diagram that depicts an exemplary implementation of a data structure stored in manufacturers DB 130. As shown, the data structure of DB 130 may include multiple entries 1100, with each entry 1100 including an OUI field 1110, a manufacturer's data field 1120, and a device class field 1130. Each entry 1100 may be indexed with, for example, a particular IoT OUI to locate an entry 1100 having a matching OUI value stored in OUI field 1110. When such an entry 1100 is located, data may be stored in fields 1120 or 1130 of the entry 1100, or data may be retrieved from fields 1120 or 1130 of the entry 1100.

OUI field 1110 stores an organizationally unique identifier that may, in one embodiment, be extracted from a MAC address associated with a particular IoT device 105. The OUI may, for example, be assigned to the particular IoT device 105 by the manufacturer of the device, or by the owner, operator or administrator of the device.

Manufacturer's data field 1120 may store one or more valid domains (i.e., domain names) associated with the OUI stored in field 1110 of a same entry 1100 of DB 130. The one or more valid domains may, in one embodiment, be manually associated with the OUI by the manufacturer of the particular IoT device 105, or by the owner, operator or administrator of the IoT device 105. Field 1120 may also store additional information that identifies the individual or entity that identified the one or more valid domains for the particular IoT device 105. Device class field 1130 stores one or more device classifications that have been identified for the IoT device 105 identified in OUI field 1110 of a same entry 1100. For example, device class field 1130 may store a device classification indicating that the IoT device 105 is a "computing" class or a "non-computing" class, as identified in block 1325 of the exemplary process of FIG. 13 below. The one or more device classifications may be identified based on an analysis of the IoT device 105's MAC address, OUI, IMEI, and/or other parameters. A "computing" classification indicates that the device may primarily be a general purpose computing device for storing, processing, and manipulating data. A "non-computing" classification indicates that the device may primarily be a device or object designed for a specific function that may, or may not, have data processing capability.

IoT device-valid domain DB 120, IoT device security SVC DB 115, and manufacturers DB 130 are depicted in FIGS. 8, 9 and 11 as including tabular data structures with a certain number of fields having certain content. The tabular data structures of DBs 120, 115 and 130 shown in FIGS. 8, 9 and 11, however, are for illustrative purposes. Other types of data structures may alternatively be used. The number, types, and content of the entries and/or fields in the data structures of DBs 120, 115 and 130 illustrated in FIGS. 8, 9 and 11 are also for illustrative purposes. Other data structures having different numbers of, types of and/or content of, the entries and/or the fields may be implemented. Therefore, IoT device-valid domain DB 120, IoT device security SVC DB 115, and manufacturers DB 130 may include additional, fewer and/or different entries and/or fields than those depicted in FIGS. 8, 9 and 11.

Figure 12:
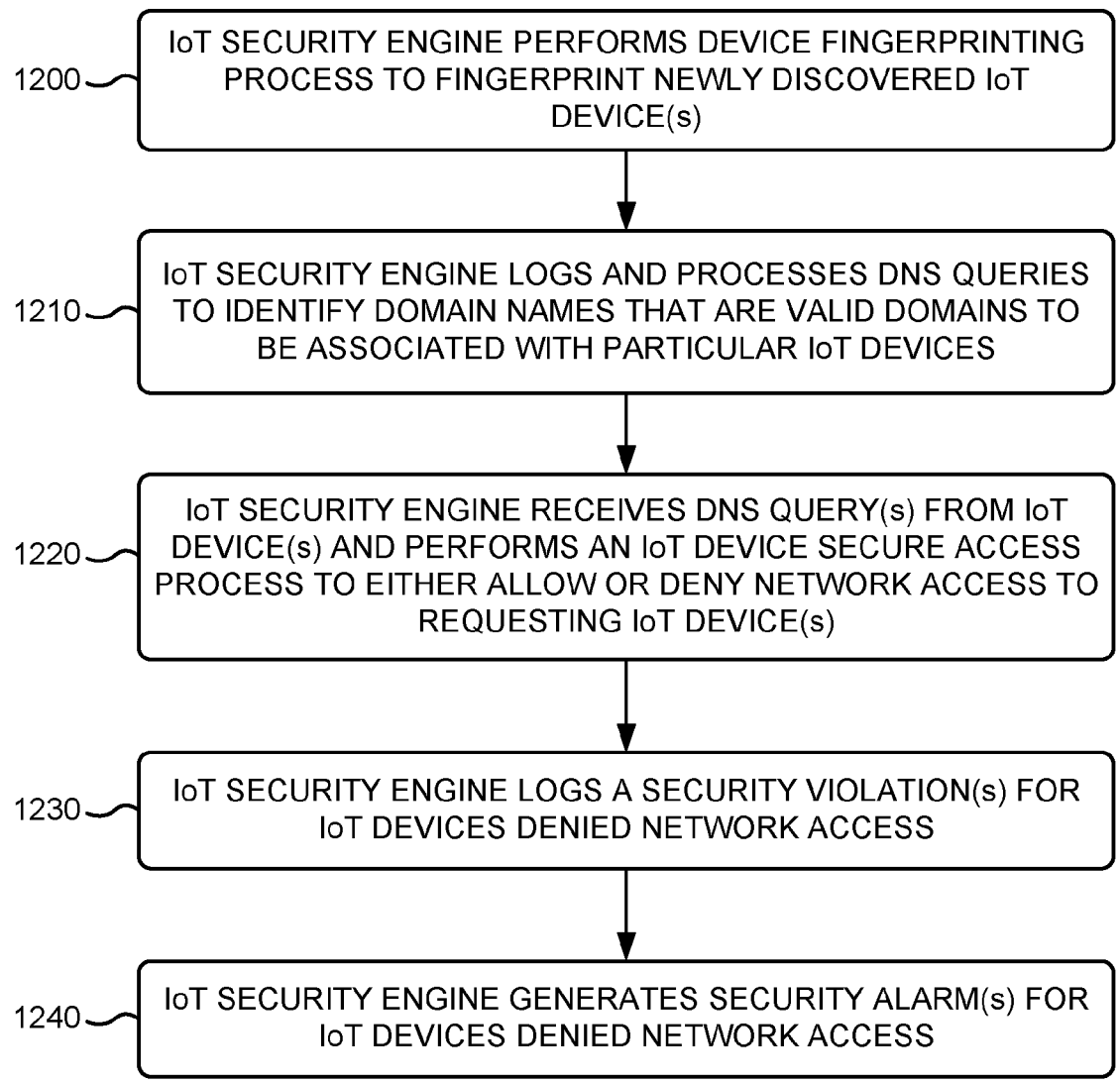
FIG. 12 is a flow diagram that illustrates an exemplary process for granting or denying network access to IoT devices based on Domain Name System queries received from the IoT devices.

FIG. 12 is a flow diagram that illustrates an exemplary process for granting or denying network access to IoT devices 105 based on DNS queries received from the IoT devices 105. The exemplary process of FIG. 12 may be implemented by IoT security engine 150.

The exemplary process includes IoT security engine 150 performing a device fingerprinting process to fingerprint a newly discovered IoT device(s) 105 (block 1200). The fingerprinting process, upon the discovery of a new IoT device 105 being connected to network 135, involves IoT security engine 150 identifying a MAC address and/or IP address associated with the IoT device 105, and further determining an OUI associated with the IoT device 105. The fingerprinting process additionally includes IoT security engine 150 identifying valid domains for the particular IoT security engine 150 either via a lookup into IoT device-valid domain DB 120, or by performing a "web crawl" through the Internet to identify one or more valid domains (e.g., manufacturer's domain(s)) for storing in IoT device-valid domain DB 120. Details of one exemplary implementation of the fingerprinting process of block 1200 are described below with respect to FIG. 13.

IoT security engine 150 logs and processes DNS queries to identify domain names that are valid domains to be associated with particular IoT devices (block 1210). Block 1210 identifies "subsidiary" domain names, in addition to those identified during execution of the device fingerprinting process of block 1200, for storage in IoT device-valid domain DB 120. The additionally identified domain names are considered legitimate domain names with which a particular IoT device 105 may communicate. Details of one exemplary implementation of the process of block 1210 are described below with respect to FIGS. 15A and 15B.

IoT security engine 150 receives a DNS query(s) from an IoT device(s) and performs an IoT device security access process to either allow or deny network access to the requesting IoT device(s) (block 1220). The IoT device security access process retrieves a domain name contained in the DNS query, and then performs a lookup into IoT device-valid domain DB 120 to compare the retrieved domain name with one or more valid domains stored in DB 120 for that particular IoT device 105. If the IoT device security access process identifies a match, then the process results in a grant of network access to the IoT device 105 that sent the DNS query. If the IoT device security access process does not identify a match, then the process results in a denial of network access to the IoT device 105 that sent the DNS query. Details of one exemplary implementation of the IoT device security access process of block 1220 are described below with respect to FIGS. 14A and 14B.

IoT security engine 150 logs a security violation(s) for IoT devices 105 denied network access (block 1230). For each IoT device 105 that is denied network access in block 1220, IoT security engine 150 logs any identifying information associated with the IoT device 105 (e.g., MAC address), a timestamp, and the domain name retrieved from the DNS query that causes the network access denial. IoT security engine 150 generates a security alarm(s) for IoT devices 105 denied network access (block 1240). The security alarm(s) may include a notification to an owner, operator and/or administrator of the network to which the particular IoT device 105 is connected, and/or a notification to the owner, operator and/or administrator of the particular IoT device 105 such that they are made aware that a particular IoT device 105 may be infected with malware.

The blocks of FIG. 12 may be continuously repeated, in sequence, or each block of FIG. 12 may be performed in parallel with every other block of FIG. 12 such that device fingerprinting, DNS query logging and identifying valid domain names, performing the IoT device secure access process, logging security violations, and generating security alarms may all occur simultaneously via processes executing in parallel.

Figure 13:
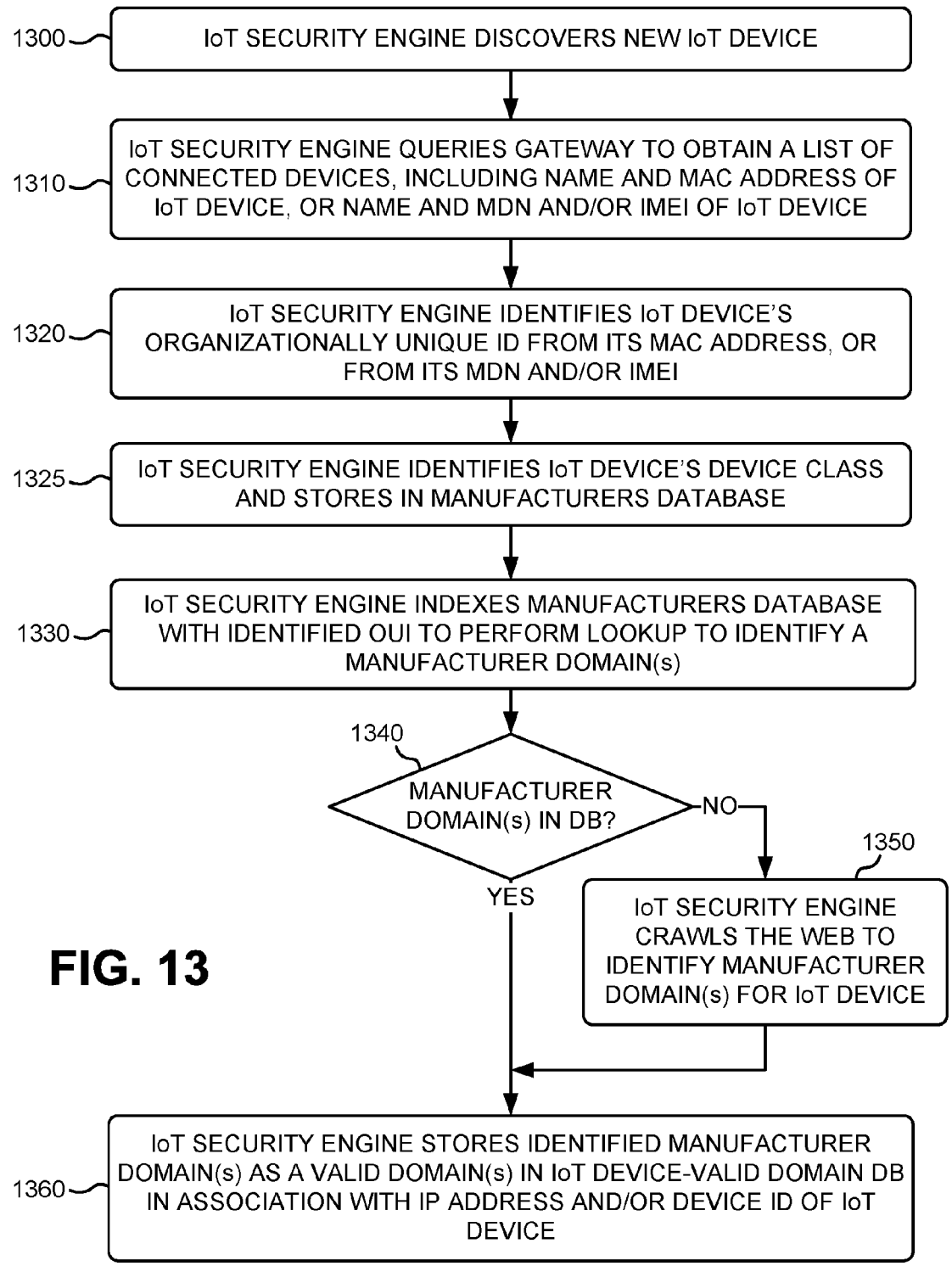
FIG. 13 is a flow diagram that illustrates an exemplary process for fingerprinting newly discovered IoT devices.

FIG. 13 is a flow diagram that illustrates an exemplary process for fingerprinting newly discovered IoT devices 105. The exemplary process of FIG. 13 corresponds to one implementation of block 1200 of FIG. 12. The exemplary process of FIG. 13 may be implemented by IoT security engine 150.

The exemplary process includes IoT security engine 150 discovering a new IoT device 105 (block 1300). IoT security engine 150 may, for example, receive a notification message from DHCP server 140, or the network node acting as DHCP server 140 (e.g., PGW-MGT APN 315 in FIG. 3 or subscriber MGT GW 520 in FIG. 4), that identifies a newly connected IoT device 105. The message may include, for example, a device name of the IoT device 105, a MAC address of the IoT device 105, a Mobile Directory Number (MDN) and/or the IMEI of the IoT device 105, and/or an IP address assigned to the IoT device 105 by DHCP server 140.

IoT security engine 150 queries a gateway to obtain a list of connected devices, including the name and MAC address of the IoT device, or name and MDN and/or IMEI of the IoT device (block 1310). In the mobile network implementation of FIG. 3, for example, IoT security engine 150 may query PGW-MGT APN 315 and/or PGW-data APN 320 to obtain a list of devices connected to mobile network 300. In the fixed network implementation of FIG. 5, for example, IoT security engine 150 may query subscriber premise GW 510 and/or subscriber MGT GW 520 to obtain a list of devices connected to network 500. In other implementations, IoT security engine 150 queries the appropriate node in the network that is aware of newly connected devices. The list of devices may identify a device name of each connected IoT device 105, a MAC address of each connected IoT device 105, a MDN and/or IMEI of each connected IoT device 105, and/or an IP address assigned to each connected IoT device 105 by DHCP server 140.

IoT security engine 150 identifies the IoT device 105's OUI from its MAC address, or from its MDN and/or IMEI (block 1320). The MAC address of IoT device 105 may be composed of its OUI and its serial number: MM:MM:MM:SS:SS:SS, where components of the MAC address identified by MM are elements of the OUI, and the components of the MAC address identified by SS are elements of the serial number. Thus, in this generic example, "MM:MM:MM" is the OUI of the IoT device 105, and "SS:SS:SS" is the serial number of the IoT device 105. For mobile IoT devices 105 having an IMEI, the Type Allocation Code (TAC) and the Final Assembly Code (FAC) of the 15 digital IMEI decimal number may be used as a device identifier that additionally may assist in identifying the device manufacturer, brand, model and/or some technical capabilities of the IoT device 105, such as bands or power class. The TAC is the initial six to eight-digit portion of the IMEI used to uniquely identify the IoT device 105. The FAC is a two-digit "final assembly code" associated with the IoT device 105 which is a manufacturer-specific code that indicates a location of the device's construction. The IMEI of IoT device 105 may be composed of its FAC code, TAC code, serial number, and Luhn code: AA BBBBBB CCCCCC D, where AA is the FAC code, BBBBBB is the FAC code, CCCCCC is the serial number, and D is the Luhn code. The Luhn code is a check digit used to identify errors in the IMEI. In one implementation, an IoT device 105 may be identified via an Extension Mechanisms for DNS protocol (EDNS0) that permits the inclusion of an additional field in a DNS query for identifying the IoT device 105.

IoT security engine 150 identifies IoT device 105's device class and stores the identified device class in manufacturers database 130 (block 1325). IoT security engine 150 may analyze the IoT device 105's MAC address, OUI, IMEI, and/or other parameters to classify the IoT device 105 as either a "computing" class or a "non-computing" class. Upon identification of the device class, IoT security engine 150 indexes manufacturers DB 130 with the identified OUI to identify an entry 1100 having a value in field 1110 that matches the identified OUI of the IoT device 105. IoT security engine 150 stores the identified device class (e.g., "computing" or "non-computing") in field 1130 of the identified entry 1100. In other implementations, different types of device classifications, other than or in addition to, a "computing" class or a "non-computing" class, may be identified by IoT security engine 150 for the IoT device 105 from an analysis of the IoT device 105's MAC address, OUI, IMEI, and/or other parameters.

IoT security engine 150 indexes manufacturers DB 130 with the identified OUI to perform a lookup to identify a manufacturer domain(s) (block 1330). IoT security engine 150 may take the identified OUI, and index field 1110 of each entry 1100 of DB 130 to identify an entry 1100 having a value in field 1110 that matches the identified OUI. If IoT security engine 150 identifies an entry 1100 of DB 130 having a value in field 1110 that matches the identified OUI, IoT security engine 150 retrieves data stored in field 1120 of the identified entry 1100. The retrieved data may include one or more domain names associated with the manufacturer and/or the owner, operator and/or administrator of the particular IoT device 105. For example, a thermostat IoT, manufactured by the company "BigCompany" may have "BigCompany.com" as a valid domain within DB 130.

IoT security engine 150 determines if a manufacturer domain(s) is identified in DB 130 (block 1340). If no manufacturer domain(s) is identified in DB 130 (NO—block 1340), then IoT security engine 150 crawls the web to identify a manufacturer domain(s) for the IoT device 105 (block 1350). If IoT security engine 150 does not identify an entry 1100 of DB 130 having a value in field 1110 that matches the identified OUI, then no manufacturer's domain (or a domain(s) associated with an owner, operator or administrator of the IoT device 105) will have been identified. In such a case, IoT security engine 150 may employ a web crawling technique to "crawl the web" to attempt to identify a manufacturer's domain for the IoT device 105.

If a manufacturer domain(s) is identified in DB 130 (YES—block 1340), then IoT security engine 150 stores the identified manufacturer domain(s) as a valid domain(s) in IoT device-valid domain DB 120 in association with an IP address and/or device ID of the IoT device 105 (block 1360). IoT security engine 150 indexes IoT device-valid domain DB 120 with the device ID of the IoT device 105 to identify an entry 800 of DB 120 having data in field 805 that matches the device ID. IoT security engine 150 stores the identified manufacturer's domain name in field 815 of the identified entry 800 of DB 120. Alternatively, if no entry 800 is identified having data in field 805 that matches the device ID, IoT security engine 150 may create a new entry 800 in DB 120, and may store the device ID in IoT device ID field 805 and the manufacturer's domain name in field 815.

The blocks of FIG. 13 may be selectively repeated for each new IoT device 105 discovered by IoT security engine 150.

Figure 14A:
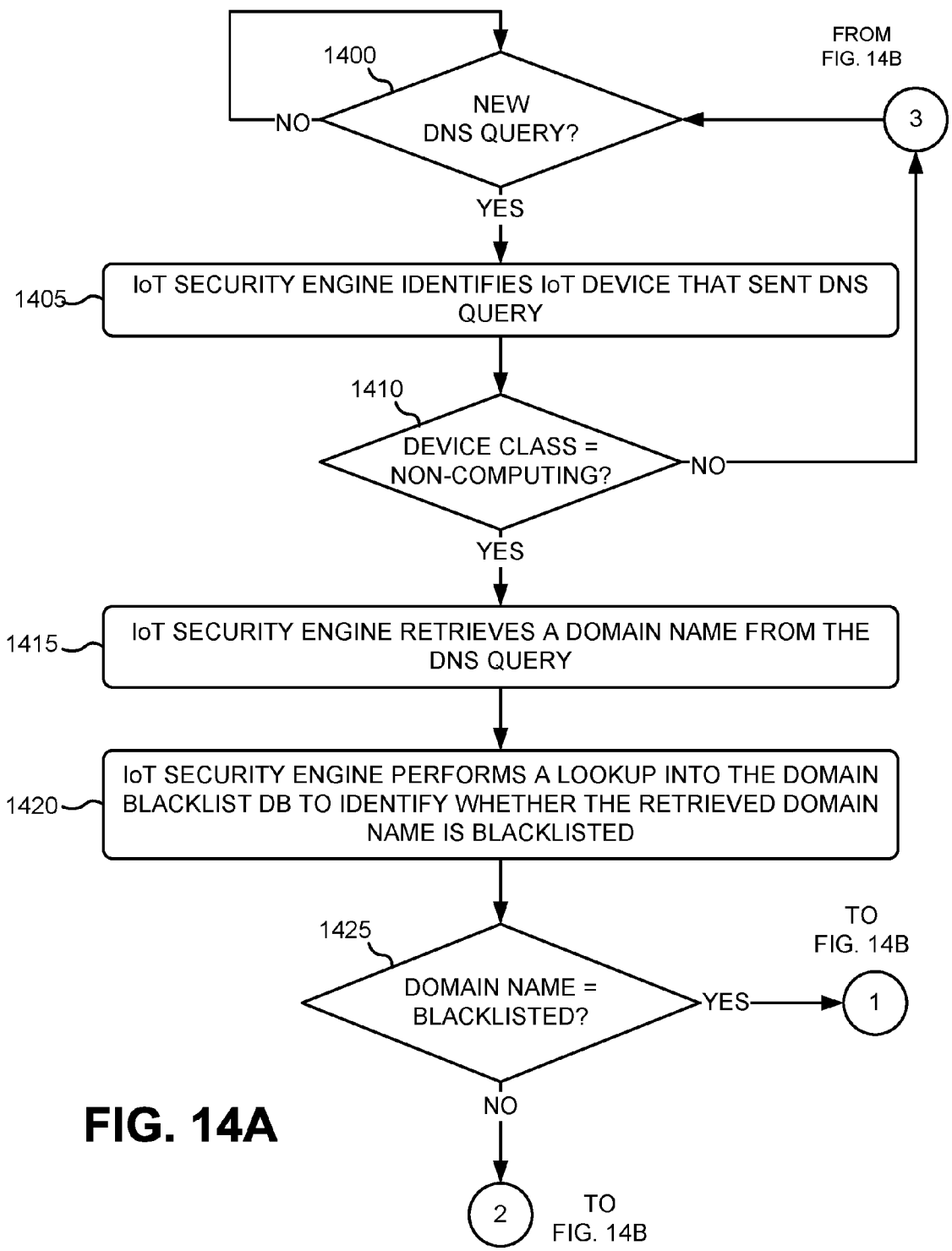
FIGS. 14A and 14B are flow diagrams that illustrate an exemplary IoT device secure access process which either allows or denies network access to a requesting IoT device(s)
Figure 14B:
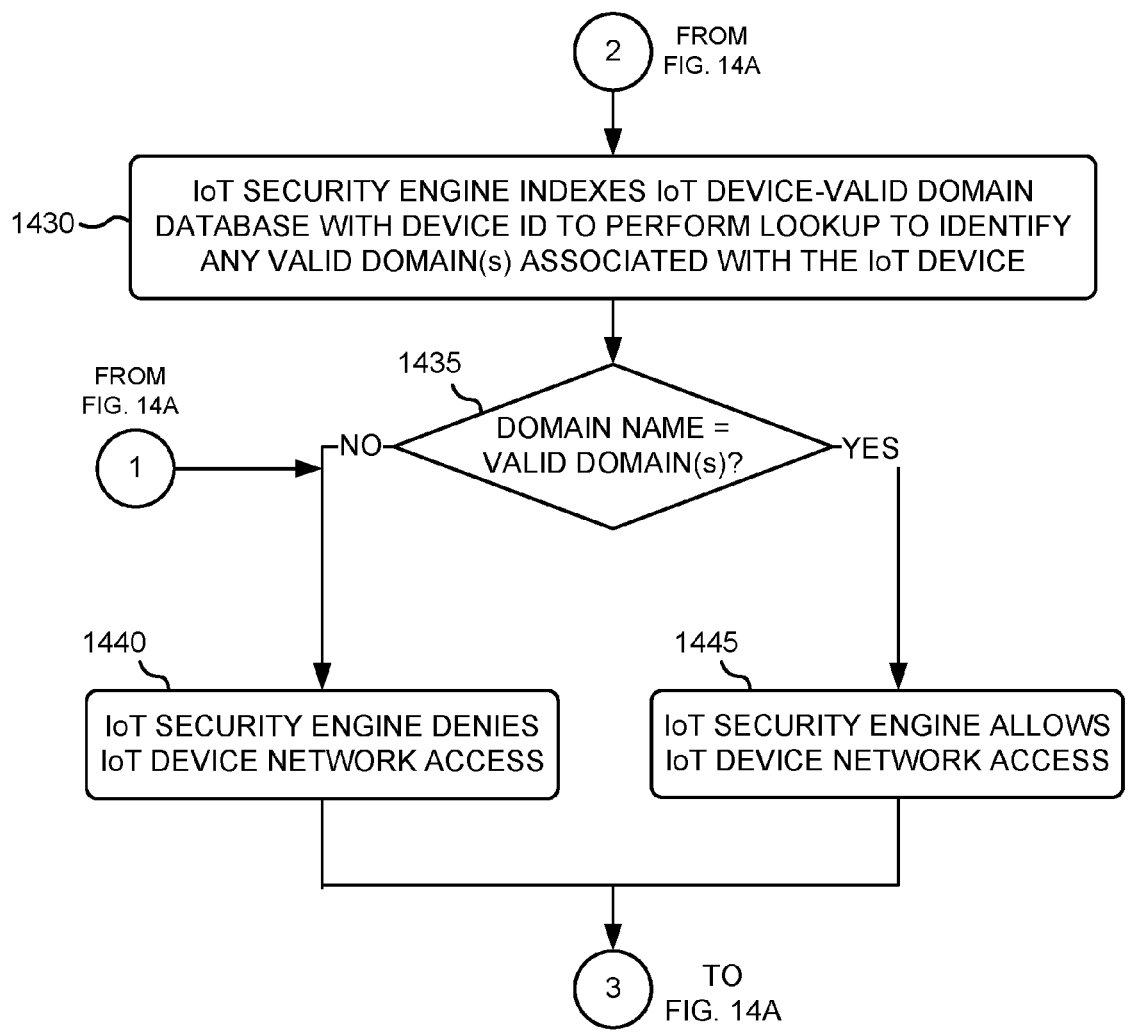

FIGS. 14A and 14B are flow diagrams that illustrate an exemplary IoT device secure access process which either allows or denies network access to a requesting IoT device(s). The exemplary process of FIGS. 14A and 14B corresponds to one implementation of block 1220 of FIG. 12. The exemplary process of FIGS. 14A and 14B may be implemented by IoT security engine 150.

The exemplary process includes IoT security engine 150 determining whether it has received a new DNS query (block 1400). If IoT security engine 150 is implemented by DNS server 145, IoT security engine 150, upon receipt of the new DNS query at DNS server 145, may be immediately aware of the new DNS query, and its contents. If IoT security engine 150 is implemented by a different network device than DNS server 145, then DNS server 145, upon receiving the new DNS query, forwards the DNS query to IoT security engine 150 at the implementing network device. Block 1400 may repeat (NO—block 1400), with IoT security engine 150 awaiting the receipt of a new DNS query. Once a new DNS query is received (YES—block 1400), then IoT security engine 150 identifies the IoT device 105 that sent the DNS query (block 1405). Identification of the IoT device 105 that sent the DNS query may include retrieving the IoT device 105's MAC address, or MDN and/or IMEI from the new DNS query.

Based on the identification of the IoT device 105, IoT security engine 150 determines if a device class of IoT device 105 is "non-computing." (block 1410). IoT security engine 150 may determine the device class of IoT device 105 based on data contained in the MAC address or the MDN and/or IMEI of the IoT device 105. In one implementation, IoT security engine 150 may index manufacturers DB 130 with the OUI of the IoT device 105 to identify an entry 1100 having OUI data stored in field 1110 that matches the OUI of the IoT device 105. IoT security engine 150 may retrieve the device class(es) stored in field 1130 of the identified entry 1100 of DB 130. IoT security engine 150 may analyze the retrieved device class(es) to determine if a device classification of "non-computing" are "computing" is associated with the particular IoT device 105.

If the device class of IoT device 105 is a "computing" class and not a "non-computing" class (NO—block 1410), then the exemplary process returns to block 1400 with IoT security engine 150 waiting for the receipt of another DNS query. If the device class of IoT device 105 is a "non-computing" class (YES—block 1410), then IoT security engine 150 retrieves a domain name from the new DNS query (block 1415). In some implementations, block 1410 may be omitted from the exemplary process of FIGS. 14A and 14B, and every single device, whether the device be a "computing" class or a "non-computing" class, may have its DNS query checked as described in blocks 1415-1445 of FIGS. 14A and 14B.

IoT security engine 150 performs a lookup into domain blacklist DB 125 to identify whether the retrieved domain name is blacklisted (block 1420). IoT security engine 150 compares the domain name retrieved from the new DNS query (from block 1415) with each domain name in field 1010 in each entry 1000 of domain blacklist DB 125. Identification of any entry 1000 that includes a domain name in field 1010 that matches the retrieved domain name from the DNS query indicates that the retrieved domain name is blacklisted and is not a valid domain for the particular IoT device 105. If IoT security engine 150 determines that the retrieved domain name is blacklisted (YES—block 1425), then the exemplary process continues at block 1440 below.

If IoT security engine 150 determines that the retrieved domain name is not blacklisted (NO—block 1425), then IoT security engine 150 indexes IoT device-valid domain DB 120 with the device ID to perform a lookup to identify any valid domain(s) associated with the IoT device 105 (block 1430)(FIG. 14B). The valid domain(s) associated with the IoT device 105 and stored in field 815 of an entry 800 having a device ID value in field 805 that matches the device ID of the IoT device 105 may have been previously stored in DB 120 such as, for example, during the process of FIG. 13 described above. IoT security engine 150 takes the device ID from the new DNS query and indexes DB 120 to locate an entry 800 having a device ID value stored in field 805 that matches the device ID from the DNS query. IoT security engine 150 then retrieves one or more domain names stored in valid domain(s) field 815 of the located entry 800 of DB 120.

Based on the lookup into IoT device-valid domain DB 120, IoT security engine 150 determines if the retrieved domain name is a valid domain(s) (block 1435). IoT security engine 150 compares the one or more domain names retrieved from valid domain(s) field 815 of DB 120 with the domain name retrieved from the DNS query. If the DNS query domain name matches any of the one or more domain names retrieved from DB 120, then the DNS query domain name is a valid domain for IoT device 105, and IoT device 105 may properly communicate (e.g., exchange data) with the network device associated with the domain name. If the lookup into IoT device-valid domain DB 120 determines that the retrieved domain name is not a valid domain identified by the lookup into DB 120 (NO—block 1435), then IoT security engine 150 denies the IoT device 105 network access (block 1440). IoT security engine 150 may notify an appropriate node in the network, such as the base station 310, the PGW-MGT APN 315, or the PGW-data APN 320 in the implementation of FIG. 3, or subscriber premise GW 510 or subscriber MGT GW 520 of the implementation of FIG. 5, and that node may block the IoT device 105's further access to the network. Blocking the IoT device 105's access to the network prevents malicious action by possible malware suspected of infecting the IoT device 105 because of IoT device 105's attempt to contact an invalid domain name.

If the lookup into IoT device-valid domain DB 120 identifies a valid domain(s) for the IoT device 105 (YES—block 1435), then IoT security engine 150 allows the IoT device 105 network access (block 1445). In the implementation of FIG. 3, IoT security engine 150 may send a network access authorization message (e.g., message 435 of FIG. 4) for the IoT device 105 to base station 310. In the implementation of FIG. 5, IoT security engine 150 may send a network access authorization message (e.g., message 635 of FIG. 6) for the IoT device 105 to subscriber premise GW 510. Subsequent to blocks 1440 and 1445, the exemplary process returns to block 1400, with IoT security engine 150 waiting for the receipt of a next new DNS query. The blocks of FIGS. 14A and 14B may be selectively repeated for each new DNS query received at IoT security engine 150.

Figure 15A:
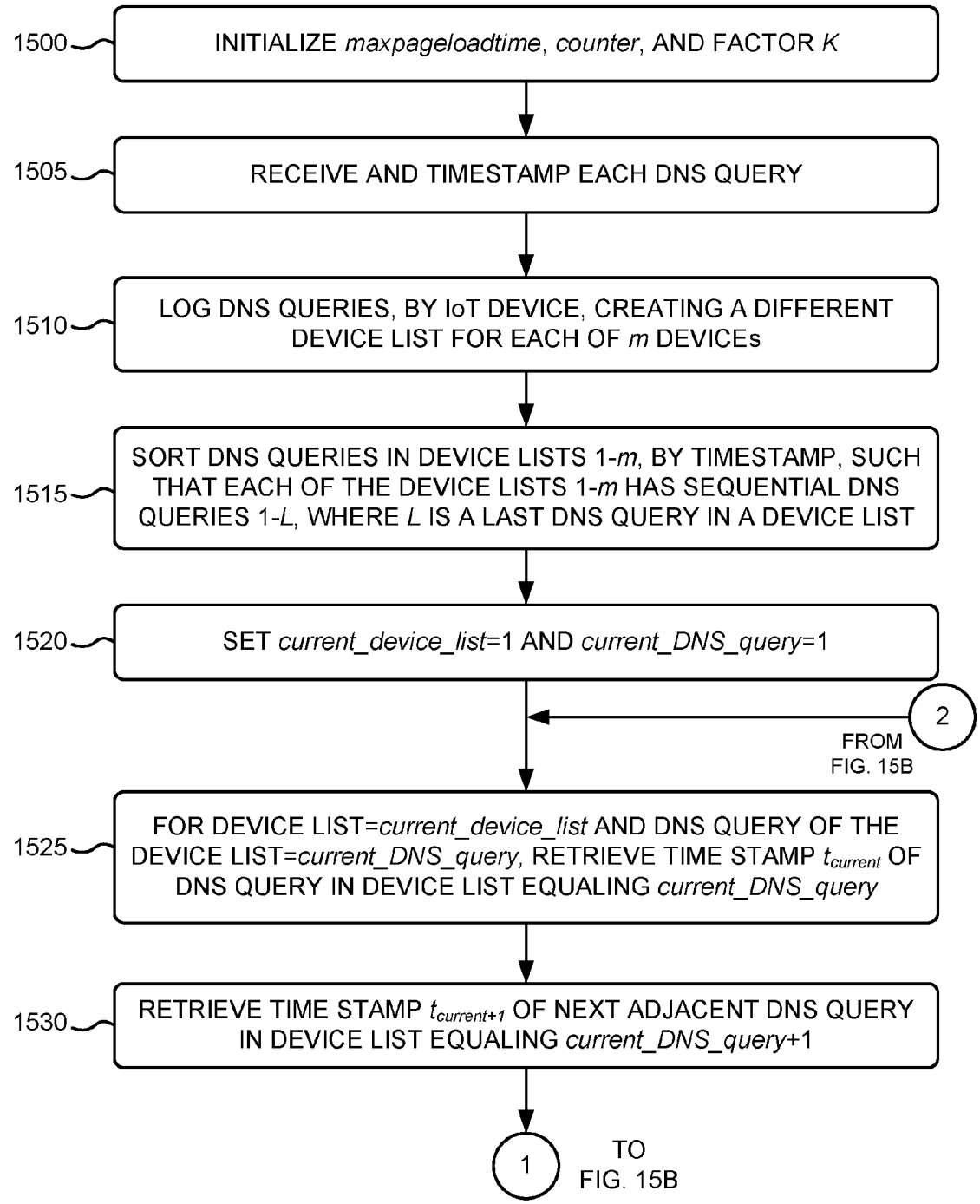
FIGS. 15A and 15B are flow diagrams that illustrate an exemplary process for logging and processing a series of domain name system queries to identify domain names that are valid domains to be associated with a particular IoT device in the IoT device-valid domain database of FIG. 1.
Figure 15B:
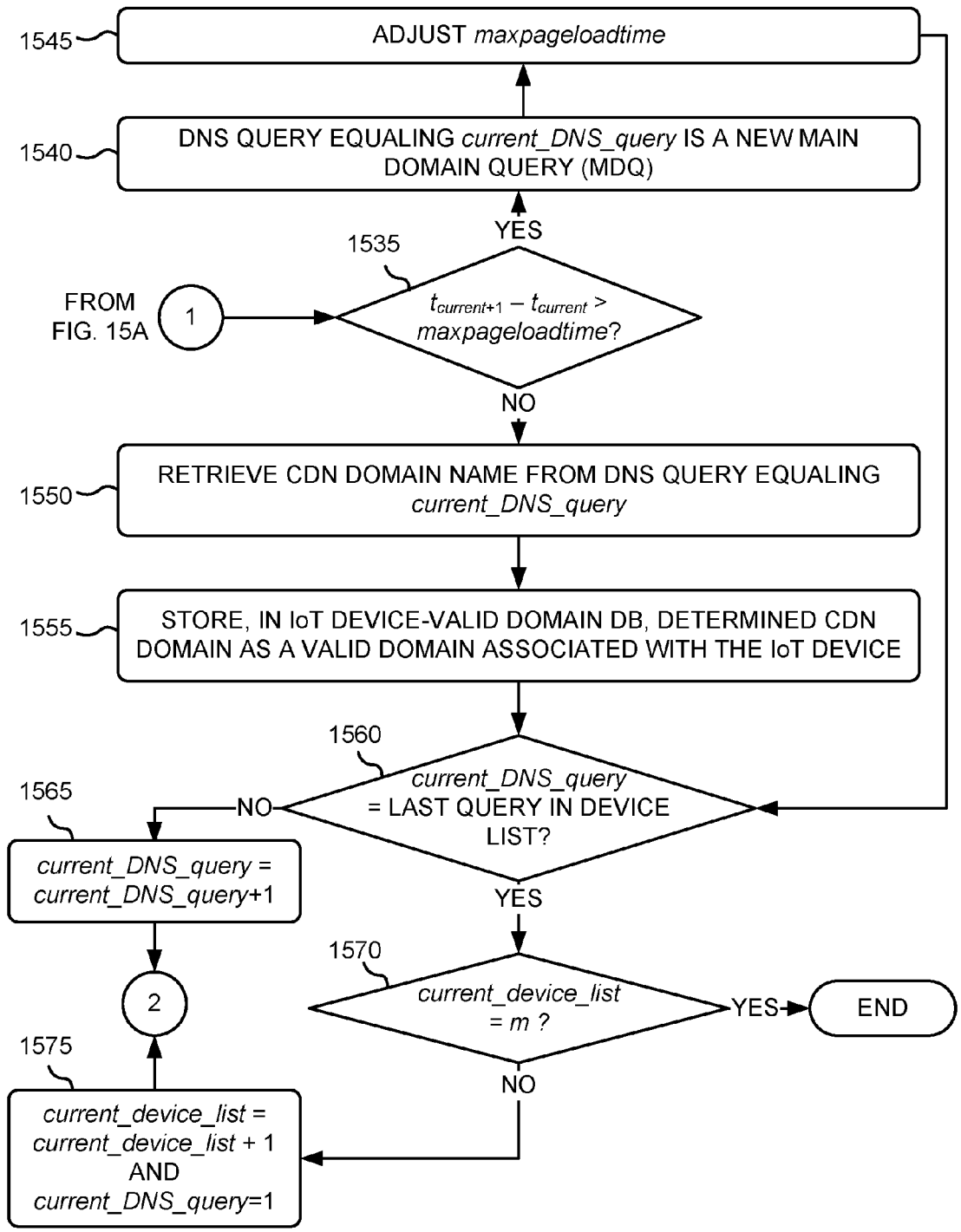

FIGS. 15A and 15B are flow diagrams that illustrate an exemplary process for logging and processing a series of DNS queries to identify domain names that are valid domains to be associated with particular IoT devices 105 in IoT device-valid domain DB 120. The exemplary process of FIGS. 15A and 15B corresponds to one implementation of block 1210 of FIG. 12. The exemplary process of FIGS. 15A and 15B may be implemented by IoT security engine 150.

The exemplary process includes IoT security engine 150 initializing a maxpageloadtime value, a counter value, and a factor K (block 1500). The maxpageloadtime value includes an estimated time to render a web page in an average web browser. In one implementation, maxpageloadtime may be set to 800 milliseconds (ms). In other implementations, a different initial value for maxpageloadtime may be used. The counter value may serve to count a number of web page requests, and may be initially set to zero. Factor K may be initially set to a value ranging from 0 to 1. In one implementation, factor K may be initially set to a value of 1/20. In other implementations, factor K may be set to other initial values within the range of 0 to 1.

IoT security engine 150 receives and timestamps each DNS query (block 1505). At the moment each DNS query is received at IoT security engine 150, IoT security engine 150 determines a current date and a current time, to microsecond accuracy, and associates the current date and the current time with the received DNS query as a timestamp for that DNS query. IoT security engine 150 logs the received DNS queries, by IoT device, creating a different device list for each of m IoT devices (i.e., device lists 1-*m*) (block 1510). Referring to the example of FIG. 16, IoT security engine 150 (not shown) creates a first device list (device list 1) that includes a logged list of DNS queries for a first IoT device, a second device list (device list 2) that includes a logged list of DNS queries for a second IoT device, and an m$^{th}$ device list (device list m) that includes a logged list of DNS queries for an m$^{th}$ IoT device. Each device list may have a list length $L_i$ (where $1 \le i \le m$) of L DNS queries, with each of the L DNS queries being associated in the list with a respective timestamp (t).

Figure 16:
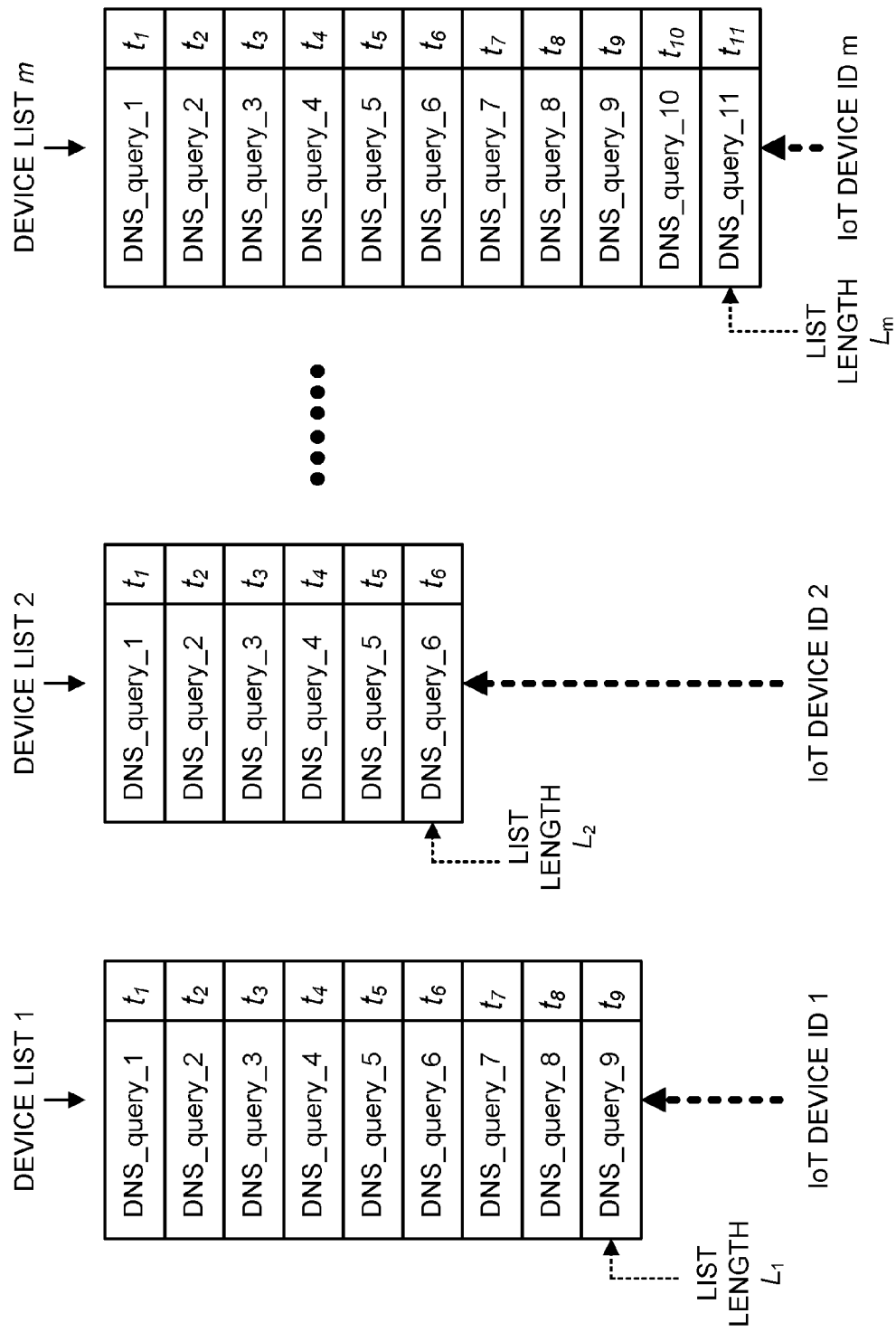
FIG. 16 depicts an example of multiple device lists that include logged domain name system queries and corresponding timestamps.

IoT security engine 150 sorts the DNS queries in device lists 1-*m*, by timestamp, such that each of the device lists 1-*m* has sequential DNS queries 1-$L_i$, where $L_i$ is a last DNS query in a device list i (block 1515). FIG. 16 depicts the DNS queries of device list 1 sorted in order, by timestamp, with the first entry of device list 1 having a timestamp $t_1$, a second entry of device list 1 having a timestamp $t_2$, a third entry of device list 1 having a timestamp $t_3$, and so on, with $t_1 < t_2 < t_3 < \ldots < t_L$. FIG. 16 similarly depicts device list 2, and device list m sorted by timestamp.

IoT security engine 150 sets a current_device_list value to 1 and a current_DNS_query value to 1 (block 1520). The current_device_list value includes a device list counter value that identifies a particular device list of device lists 1-*m* that is currently being processed by IoT security engine 150. The current_DNS_query value includes a DNS query counter value that identifies a DNS query, within the particular device list identified by current_device_list, that is currently being processed by IoT security engine 150.

For a device list equal to current_device_list and a DNS query of the device list equal to current_DNS_query, IoT security engine 150 retrieves a time stamp $t_{current}$ of the DNS query in the device list equaling current_DNS_query (block 1525), and retrieves a timestamp $t_{current+1}$ of a next adjacent DNS query in the device list equaling current_DNS_query+1 (block 1530). For example, referring to the example depicted in FIG. 16, if current_device_list=1 and current_DNS_query=1, then the IoT security engine 150 retrieves time stamp $t_1$ from the first entry (shown as "DNS_query_1") of device list 1 and sets $t_{current}$ equal to $t_1$, and retrieves timestamp $t_2$ from the second entry (shown as "DNS_query_2") of device list 1 and sets $t_{current+1}$ equal to $t_2$. As another example, if current_device_list=m and current_DNS_query=10, then the IoT security engine 150 retrieves time stamp $t_{10}$ from the tenth entry (shown as "DNS_query_10") of device list m and sets $t_{current}$ equal to $t_{10}$, and retrieves timestamp $t_{11}$ from the eleventh entry (shown as "DNS_query_11") of device list m and sets $t_{current+1}$ equal to $t_{11}$.

IoT security engine 150 determines if timestamp $t_{current+1}$ minus timestamp $t_{current}$ is greater than the maxpageloadtime value (block 1535)(FIG. 15B). IoT security engine 150 subtracts the time value of $t_{current}$ from the time value of $t_{current+1}$ and compares the resulting difference value with the maxpageloadtime value. If the comparison indicates that the difference between timestamp $t_{current+1}$ and timestamp $t_{current}$ is not greater than the maxpageloadtime value (i.e., is equal to or less than maxpageloadtime) (NO—block 1535), then the exemplary process continues at block 1550 below. If the comparison indicates that the difference between timestamp $t_{current+1}$ and timestamp $t_{current}$ is greater than the maxpageloadtime value (YES—block 1535), then IoT security engine 150 identifies the DNS query equaling current_DNS_query as a new main domain query (MDQ) (block 1540). A "main domain query" is a designation that indicates that the domain name associated with the DNS query is likely a domain name of a "landing" web page, and a subsequent number of different domain names contained in DNS queries from a same IoT device are likely domain names associated with links, contained in the landing page, to other resources at other network nodes that are to be retrieved and included in the landing page when the landing page is browsed in a browser. For example, the domain name "CNN.com" may include links to other content, advertisements, video clips, etc. and, therefore, the domain name "CNN.com" would be considered the "main domain query" and the DNS queries containing domain names associated with the links to the other content would be considered to be "subsidiary" DNS queries under that "main domain query." The domain names contained in such "subsidiary" DNS queries may typically be associated with network nodes in one or more Content Delivery Networks (CDNs).

IoT security engine 150 may maintain a log of each DNS query identified as a "main domain query," including each timestamp associated with the "main domain query." The log may include, for example, a sequence of timestamps $t_{MDQ-x}, \ldots, t_{MDQ-3}, t_{MDQ-2}, t_{MDQ-1}, t_{MDQ}$, where MDQ-x is the oldest DNS query identified as a main domain query, and MDQ is the most recent DNS query identified as a main domain query.

IoT security engine 150 adjusts the maxpageloadtime value (block 1545). Adjusting the maxpageloadtime value includes using one or more of various mathematical functions involving the counter value and/or the factor K. Details of one exemplary implementation of block 1545 are described below with respect to FIG. 17. After adjusting maxpageloadtime, the exemplary process continues at block 1560 below.

At block 1550, IoT security engine 150 retrieves the CDN domain name from the DNS query equaling current_DNS_query. The DNS query may include various types of data, including data that is the domain name of the network node, in a CDN, with which the IoT device is attempting to communicate to send and/or receive data. IoT security engine 150 extracts the data corresponding to the domain name from the DNS query. The extracted domain name may be considered to be a "subsidiary" domain name under a "main" domain name contained in the current "main domain query" most recently identified in block 1540.

IoT security engine 150 stores, in IoT device-valid domain DB 120, the determined CDN domain as a valid domain associated with the IoT device 105 (block 1555). IoT security engine 150 indexes DB 120 with the device ID of the IoT device 105 to identify an entry 800 having a device identifier value stored in field 805 that matches the device ID of IoT device 105. IoT security engine 150 stores the determined CDN domain in valid domain(s) field 815 of the identified entry 800, possibly in conjunction with another valid domain(s) already stored in field 815.

IoT security engine 150 determines if current_DNS_query is the last query in the device list (block 1560). Referring to the example of FIG. 16, if current_device_list is equal to 1, and current_DNS_query is equal to 8 (i.e., "DNS_query_8"), then IoT security engine 150, checking device list 1, determines that there is a further DNS query in the device list (e.g., "DNS_query_9") and that "DNS_query_8" is not the last query in device list 1. If current_DNS_query is not the last query in the device list (NO—block 1565), then IoT security engine 150 increments the current_DNS_query value (i.e., current_DNS_query=current_DNS_query+1) (block 1565), and the exemplary process returns to block 1525, for processing the next DNS query in the current_device_list of the m device lists.

If IoT security engine 150 determines that current_DNS_query is the last query in the device list (YES—block 1560), then IoT security engine 150 determines if current_device_list is equal to the last device list of m device lists (block 1570). Referring to the example of FIG. 16, if current_device_list is equal to m, and current_DNS_query is equal to 11 (i.e., "DNS_query_11"), then IoT security engine 150, checking device list m, determines that there are no further DNS queries in the device list and that "DNS_query_11" is the last query in the last ($m^{th}$) device list.

If the device list is the mth device list of m device lists (i.e., current_device_list is equal to m) (YES—block 1570) then, in one implementation, the exemplary process ends (as shown in FIG. 15B). If the device list is not the last device list of m device lists (NO—block 1570), and current_device_list is not, therefore, equal to m, then IoT security engine 150 increments current_device_list (i.e., current_device_list=current_device_list+1) and resets current_DNS_query to one (i.e., current_DNS_query=1) (block 1575). The exemplary process returns to block 1525, for processing the first DNS query in the next device list in the m device lists.

Figure 17:
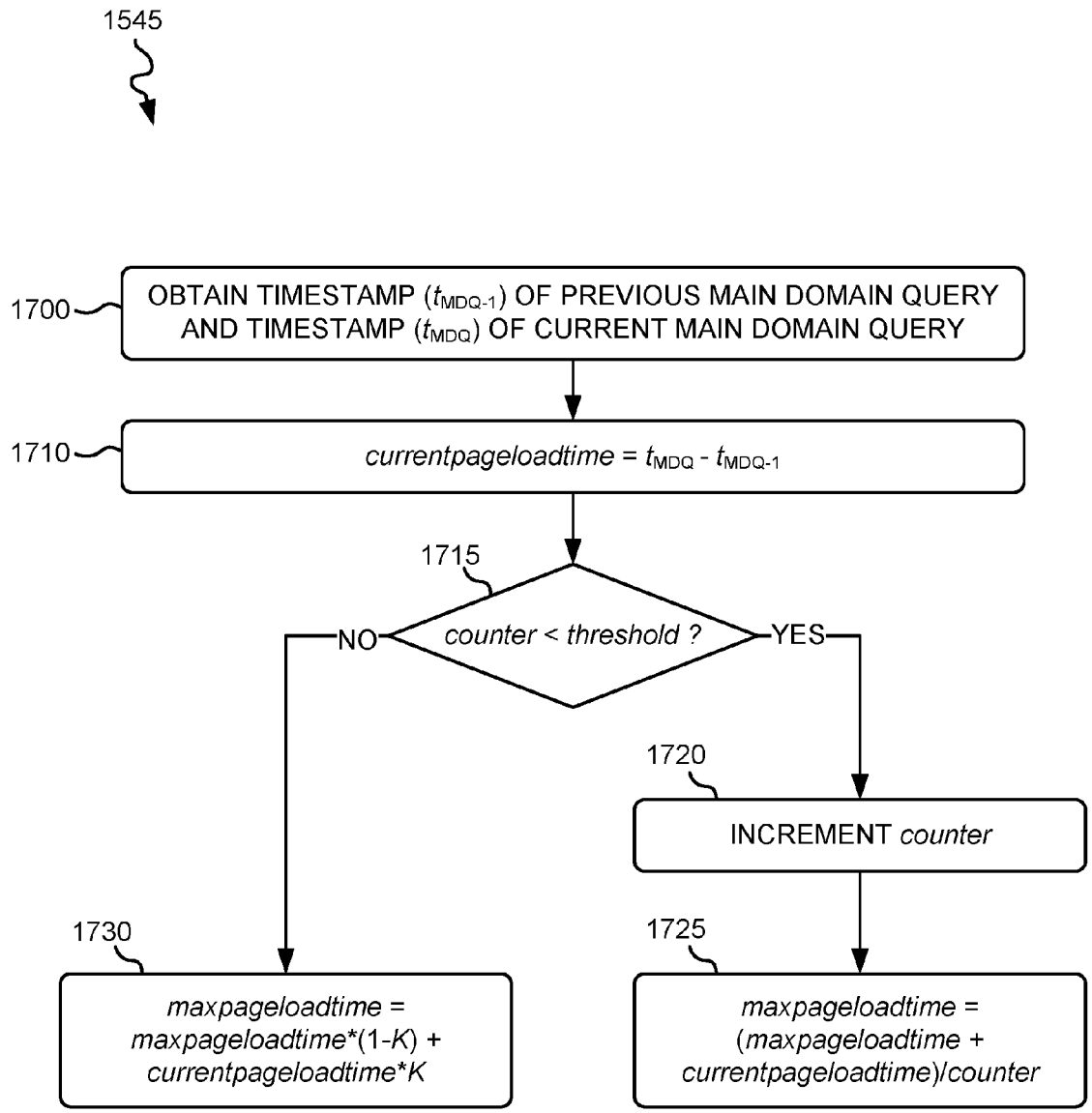
FIG. 17 is a flow diagram that illustrates details of one exemplary implementation of the maxpageloadtime value adjustment of FIG. 15B.

FIG. 17 is a flow diagram that illustrates details of one exemplary implementation of block 1545 of FIG. 15B in which the maxpageloadtime value is adjusted. The exemplary process of FIG. 17 may be implemented by IoT security engine 150.

In block 1700 (which occurs subsequent to block 1540 of FIG. 15), IoT security engine 150 obtains a timestamp ($t_{MDQ-1}$) of a previous main domain query (identified as a main domain query during a previous execution of block 1540 of FIG. 15B) and a timestamp ($t_{MDQ}$) of a current main domain query (identified as a main domain query during a most recent execution of block 1540 of FIG. 15B). IoT security engine 150 subtracts the timestamp of the previous main domain query ($t_{MDQ-1}$) from the timestamp ($t_{MDQ}$) of the current main domain query to produce a currentpageloadtime value (i.e., currentpageloadtime=$t_{MDQ-1}-t_{MDQ}$) (block 1710). The currentpageloadtime value may approximate the time that it takes a browser to load a webpage corresponding to a main domain query, including loading "subsidiary" content (e.g., advertisements, video content, etc.) pointed to by links contained in the webpage corresponding to the main domain query.

IoT security engine 150 determines if the counter value is less than a threshold value (block 1715). The counter value may have been initialized with a value in block 1500 of FIG. 15A. The counter value may count a number of web page requests, and the threshold value may include a number used to select whether to adjust the maxpageloadtime value using a simple average, or to adjust the maxpageloadtime value using an exponential moving average (EMA). For a number of web page requests less than the threshold value, the simple average may be computed to determine the maxpageloadtime value. After a number of web page requests greater than or equal to the threshold value, the EMA may be computed to determine the maxpageloadtime value. In one exemplary implementation, the threshold value may be set to 20, indicating than an EMA will start being computed after 20 web page requests. In other implementations, however, a different threshold value may be used.

An EMA may be computed to adjust the maxpageloadtime value so that the weight of older data points decreases exponentially over time. The EMA may be applied to computing the maxpageloadtime value because the time to load a web page, including loading all "subsidiary" content pointed to by links within the web page, may vary over time due to changes in technology and network bandwidth (e.g., due to increases in network speed, increases in the speed at which requests are processed, increases in the speed at which a browser application operates, etc.). Therefore, as the technology changes over time, the EMA assigns lower weights to older web page loading times and higher weights to recent web page loading times. The EMA of the maxpageloadtime value functions as a low pass filter by removing any sudden effects of outlier web page loading times that may occur as a result of network or server device load conditions. Furthermore, the EMA may be efficient to compute, as it does not require maintaining a history of previous web page load times.

If the counter value is less than the threshold value (YES—block 1715), then IoT security engine 150 increments the counter value (i.e., counter=counter+1) (block 1720), and adjusts the maxpageloadtime value as follows (block 1725):

$$\text{maxpageloadtime} = (\text{maxpageloadtime} + \text{currentpageloadtime})/\text{counter} \quad \text{Eqn. (1)}$$

If the counter value is not less than the threshold value (NO—block 1715)(i.e., the counter value is greater than or equal to the threshold value), then IoT security engine 150 adjusts the maxpageloadtime value as follows (block 1730):

$$\text{maxpageloadtime} = \text{maxpageloadtime}*(1-K) + \text{currentpageloadtime}*K$$

where the factor K may have been initialized with a value in block 1500 of FIG. 15A. Block 1560 of FIG. 15B (described above) proceeds to execute subsequent to the execution of blocks 1725 or 1730 of FIG. 17.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 12, 13, 14A-14B, 15A-15B, and 17, and message flows with respect to FIGS. 4 and 6, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a node via a point of network attachment in a network from an Internet of Things (IoT) device, a Domain Name System (DNS) query that includes a domain name for resolving a network address associated with a remote server with which the IoT device intends to communicate;
   retrieving the domain name associated with the remote server from the DNS query;
   retrieving a Mobile Directory Number (MDN) or an International Mobile Station Equipment Identity (IMEI) number from the DNS query;
   determining, based on the MDN or the IMEI number, an identity associated with the IoT device;
   identifying, based on the MDN or the IMEI number, a device classification associated with the IoT device, wherein the device classification indicates that the IoT device is classified as a computing classification corresponding to general-purpose computing devices or a non-computing classification corresponding to specific-function processing devices;
   performing, when the device classification identified is the computing classification, no further operations with respect to the DNS Query;
   determining, when the device classification identified is the non-computing classification, one or more valid domains associated with the determined IoT device identity;
   comparing the domain name retrieved from the DNS query with the determined one or more valid domains associated with the determined IoT device identity;
   allowing network access to the IoT device if the domain name associated with the remote server matches one of the one or more valid domains; and
   denying network access to the IoT device if the domain name associated with the remote server does not match any of the one or more valid domains.

2. The method of claim 1, wherein retrieving a Mobile Directory Number (MDN) or an International Mobile Station Equipment Identity (IMEI) number comprises retrieving the MDN, and the IMEI number from the DNS query; and
   wherein identifying the device classification comprises:
   determining the device classification based on data contained in the MDN and the IMEI number.

3. The method of claim 1, wherein determining the one or more valid domains associated with the determined IoT device identity comprises:
   performing a lookup into a database, using the determined IoT device identity, to retrieve the one or more valid domains associated with the IoT device identity.

4. The method of claim 1, further comprising:
   logging a security violation in response to denying the network access to the IoT device.

5. The method of claim 1, further comprising:
   sending a notification message to a network base station or a gateway associated with the point of network attachment, in response to denying the network access to the IoT device.

6. The method of claim 1, further comprising:
   performing lookups into a blacklisting database that stores blacklisted domain names;
   comparing the domain name retrieved from the DNS query with one or more domain names stored in the blacklisting database; and
   denying network access to the IoT device if the comparison indicates that there is a match between the domain name retrieved from the DNS query and the one or more domain names stored in the blacklisting database.

7. A network device, comprising:
   a transceiver connected to a network and configured to:
   receive, from an Internet of Things (IoT) device via a point of network attachment, a Domain Name System (DNS) query that includes a domain name for resolving a network address associated with a remote server with which the IoT device intends to communicate; and a processing unit configured to:
retrieve the domain name associated with the remote server from the DNS query,
retrieve a Mobile Directory Number (MDN) or an International Mobile Station Equipment Identity (IMEI) number from the DNS query,
determine, based on the MDN or the IMEI number, an identity associated with the IoT device,
identify, based on the MDN or the IMEI number, a device classification associated with the IoT device, wherein the device classification indicates that the IoT device is classified as a computing classification corresponding to general-purpose computing devices or a non-computing classification corresponding to specific-function processing devices,
perform, when the device classification identified is the computing classification, no further operations with respect to the DNS Query,
determine, when the device classification identified is the non-computing classification, one or more valid domains associated with the determined IoT device identity,
compare the domain name retrieved from the DNS query with the determined one or more valid domains associated with the determined IoT device identity, and
allow or deny network access to the IoT device based on the comparison.

8. The network device of claim 7, wherein, when allowing or denying the network access to the IoT device, the processing unit is further configured to:
allow network access to the IoT device if the domain name associated with the remote server matches one of the one or more valid domains, and
deny network access to the IoT device if the domain name associated with the remote server does not match any of the one or more valid domains.

9. The network device of claim 8, wherein the processing unit is further configured to:
log a security violation in response to the denial of the network access to the IoT device.

10. The network device of claim 8, wherein the processing units is further configured to:
send a notification message to a network base station or a gateway associated with the point of network attachment, in response to the denial of the network access to the IoT device.

11. The network device of claim 7, wherein the processing unit is further configured to:
retrieve the MDN and the IMEI number from the DNS query; and
wherein when identifying the device classification, the processing unit is further configured to:
determine the device classification based on data contained in the MDN and the IMEI number.

12. The network device of claim 7, wherein, when determining the one or more valid domains associated with the determined IoT device identity, the processing unit is further configured to:
perform a lookup into a database, using the determined IoT device identity, to retrieve the one or more valid domains associated with the IoT device identity.

13. The network device of claim 7, wherein the processing units is further configured to:

perform lookups into a blacklisting database that stores blacklisted domain names;
compare the domain name retrieved from the DNS query with one or more domain names stored in the blacklisting database; and
deny network access to the IoT device if the comparison indicates that there is a match between the domain name retrieved from the DNS query and the one or more domain names stored in the blacklisting database.

14. A non-transitory storage medium storing instructions executable by a computational device, wherein the instructions comprise instructions to cause the computational device to:
receive, from an Internet of Things (IoT) device via a point of network attachment, a Domain Name System (DNS) query that includes a domain name for resolving a network address associated with a remote server with which the IoT device intends to communicate;
retrieve the domain name associated with the remote server from the DNS query;
retrieve a Mobile Directory Number (MDN) or an International Mobile Station Equipment Identity (IMEI) number from the DNS query,
determine, based on the MDN or the IMEI number, an identity associated with the IoT device;
identify, based on the MDN or the IMEI number, a device classification associated with the IoT device, wherein the device classification indicates that the IoT device is classified as a computing classification corresponding to general-purpose computing devices or a non-computing classification corresponding to specific-function processing devices;
perform, when the device classification identified is the computing classification, no further operations with respect to the DNS Query,
determine, when the device classification identified is the non-computing classification, one or more valid domains associated with the determined IoT device identity;
compare the domain name retrieved from the DNS query with the determined one or more valid domains associated with the determined IoT device identity; and
allow or deny network access to the IoT device based on the comparison.

15. The non-transitory storage medium of claim 14, wherein the instructions comprise instructions to cause the computational device to:
allow network access to the IoT device if the domain name associated with the remote server matches one of the one or more valid domains, and
deny network access to the IoT device if the domain name associated with the remote server does not match any of the one or more valid domains.

16. The non-transitory storage medium of claim 14, wherein, the instructions further comprise instructions to cause the computational device to:
retrieve the MDN and the IMEI number from the DNS query; and
wherein, when identifying the device classification, the instructions further comprise instructions to cause the computational device to:
determine the device classification based on data contained in the MDN, and the IMEI number.

17. The non-transitory storage medium of claim 14, wherein, when determining the one or more valid domains associated with the determined IoT device identity, the instructions further comprise instructions to cause the computational device to:
  perform a lookup into a database, using the determined IoT device identity, to retrieve the one or more valid domains associated with the IoT device identity.

18. The non-transitory storage medium of claim 14, wherein the instructions further comprise instructions to cause the computational device to:
  log a security violation in response to the denial of the network access to the IoT device.

19. The non-transitory storage medium of claim 14, wherein the instructions further comprise instructions to cause the computational device to:
  send a notification message to a network base station or a gateway associated with the point of network attachment, in response to the denial of the network access to the IoT device.

20. The non-transitory storage medium of claim 14, wherein the instructions further comprise instructions to cause the computational device to:
  perform lookups into a blacklisting database that stores blacklisted domain names;
  compare the domain name retrieved from the DNS query with one or more domain names stored in the blacklisting database; and
  deny network access to the IoT device if the comparison indicates that there is a match between the domain name retrieved from the DNS query and the one or more domain names stored in the blacklisting database.

* * * * *